(12) United States Patent
Bassin et al.

(10) Patent No.: US 10,235,269 B2
(45) Date of Patent: Mar. 19, 2019

(54) SYSTEM AND METHOD TO PRODUCE BUSINESS CASE METRICS BASED ON DEFECT ANALYSIS STARTER (DAS) RESULTS

(75) Inventors: Kathryn A. Bassin, Endicott, NY (US); Steven Kagan, Oakbrook Terrace, IL (US); Shao C. Li, Beijing (CN); Zhong J. Li, Beijing (CN); He H. Liu, Beijing (CN); Susan E. Skrabanek, Atlanta, GA (US); Hua F. Tan, Beijing (CN); Jun Zhu, Shanghai (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1316 days.

(21) Appl. No.: 12/558,324

(22) Filed: Sep. 11, 2009

(65) Prior Publication Data

US 2011/0066557 A1    Mar. 17, 2011

(51) Int. Cl.
*G06F 11/36* (2006.01)
*G06Q 10/06* (2012.01)
*G06Q 10/10* (2012.01)

(52) U.S. Cl.
CPC ......... *G06F 11/3616* (2013.01); *G06Q 10/06* (2013.01); *G06Q 10/067* (2013.01); *G06Q 10/103* (2013.01)

(58) Field of Classification Search
USPC ....................................................... 705/7.38
See application file for complete search history.

(56) References Cited

U.S. PATENT DOCUMENTS

| | | | |
|---|---|---|---|
| 5,539,652 | A | 7/1996 | Tegethoff |
| 5,651,111 | A | 7/1997 | McKeeman et al. |
| 5,724,273 | A | 3/1998 | Desgrousilliers et al. |
| 5,854,924 | A | 12/1998 | Rickel et al. |
| 5,905,856 | A | 5/1999 | Ottensooser |
| 6,154,876 | A | 11/2000 | Haley et al. |
| 6,186,677 | B1 | 2/2001 | Angel et al. |

(Continued)

OTHER PUBLICATIONS

Notice of Allowance dated Apr. 15, 2013 in related U.S. Appl. No. 12/558,274, 20 pages.

(Continued)

*Primary Examiner* — Leland Marcus
(74) *Attorney, Agent, or Firm* — Christopher McLane; Andrew M. Calderon; Roberts Mlotkowski Safran Cole & Calderon, P.C.

(57) ABSTRACT

A method is implemented in a computer infrastructure having computer executable code tangibly embodied on a computer readable storage medium having programming instructions. The programming instructions are operable to receive data including defect analysis defect analysis starter (DAS)/defect reduction method (DRM) defect analysis data of a software development project and process the data. Additionally, the programming instructions are operable to determine one or more business metrics based on the data and generate at least one report based on the one or more business metrics. The one or more business metrics comprises at least one of a benefit for shifting defect removal earlier, a benefit for preventing an injection of defects, a benefit for reducing a cycle time, a benefit of reducing invalid defects and a benefit for reducing production defects.

22 Claims, 17 Drawing Sheets

(56) References Cited

U.S. PATENT DOCUMENTS

| | | |
|---|---|---|
| 6,243,863 B1 | 6/2001 | Kothari |
| 6,332,211 B1 | 12/2001 | Pavela |
| 6,442,748 B1 | 8/2002 | Bowman-Amuah |
| 6,456,506 B1 | 9/2002 | Lin |
| 6,477,471 B1* | 11/2002 | Hedstrom et al. ............. 702/34 |
| 6,519,763 B1 | 2/2003 | Kaufer et al. |
| 6,546,506 B1 | 4/2003 | Lewis |
| 6,601,017 B1 | 7/2003 | Kennedy et al. |
| 6,601,233 B1 | 7/2003 | Underwood |
| 6,725,399 B1 | 4/2004 | Bowman |
| 6,766,473 B2 | 7/2004 | Nozuyama |
| 6,862,696 B1 | 3/2005 | Voas et al. |
| 6,889,167 B2 | 5/2005 | Curry |
| 6,901,535 B2 | 5/2005 | Yamauchi et al. |
| 6,988,055 B1 | 1/2006 | Rhea et al. |
| 7,080,351 B1 | 7/2006 | Kirkpatrick et al. |
| 7,200,775 B1 | 4/2007 | Rhea et al. |
| 7,219,287 B1 | 5/2007 | Toutounchi et al. |
| 7,231,549 B1 | 6/2007 | Rhea et al. |
| 7,334,166 B1 | 2/2008 | Rhea et al. |
| 7,451,009 B2 | 11/2008 | Grubb et al. |
| 7,630,914 B2 | 12/2009 | Veeningen et al. |
| 7,788,647 B2 | 8/2010 | Martin et al. |
| 7,809,520 B2 | 10/2010 | Adachi |
| 7,861,226 B1* | 12/2010 | Episkopos et al. ............ 717/124 |
| 7,886,272 B1* | 2/2011 | Episkopos et al. ............ 717/124 |
| 7,917,897 B2 | 3/2011 | Bassin et al. |
| 7,984,304 B1 | 7/2011 | Waldspurger et al. |
| 8,001,530 B2 | 8/2011 | Shitrit |
| 8,191,044 B1 | 5/2012 | Berlik et al. |
| 8,224,472 B1 | 7/2012 | Maluf et al. |
| 8,539,438 B2 | 9/2013 | Bassin et al. |
| 8,578,341 B2 | 11/2013 | Bassin et al. |
| 8,688,426 B2 | 4/2014 | Al-Shammari |
| 9,052,981 B2 | 6/2015 | Bassin et al. |
| 2001/0052108 A1 | 12/2001 | Bowman-Amuah |
| 2002/0078401 A1 | 6/2002 | Fry |
| 2002/0188414 A1 | 12/2002 | Nulman |
| 2003/0018952 A1 | 1/2003 | Roetzheim |
| 2003/0033191 A1 | 2/2003 | Davies et al. |
| 2003/0058277 A1 | 3/2003 | Bowman-Amuah |
| 2003/0070157 A1 | 4/2003 | Adams et al. |
| 2003/0196190 A1 | 10/2003 | Ruffolo et al. |
| 2004/0205727 A1* | 10/2004 | Sit et al. .................. 717/125 |
| 2004/0225465 A1 | 11/2004 | Pramanick et al. |
| 2004/0267814 A1 | 12/2004 | Ludwig et al. |
| 2005/0021766 A1 | 1/2005 | McKeowen et al. |
| 2005/0060598 A1 | 3/2005 | Klotz et al. |
| 2005/0071807 A1* | 3/2005 | Yanavi ..................... 717/104 |
| 2005/0102654 A1 | 5/2005 | Henderson et al. |
| 2005/0114828 A1 | 5/2005 | Dietrich et al. |
| 2005/0144529 A1 | 6/2005 | Gotz et al. |
| 2005/0209866 A1 | 9/2005 | Veeningen et al. |
| 2005/0283751 A1* | 12/2005 | Bassin et al. ................ 717/100 |
| 2006/0047527 A1 | 3/2006 | Caveny et al. |
| 2006/0047617 A1 | 3/2006 | Bacioiu et al. |
| 2006/0123389 A1 | 6/2006 | Kolawa et al. |
| 2006/0248504 A1 | 11/2006 | Hughes |
| 2006/0251073 A1 | 11/2006 | Lepel et al. |
| 2006/0265188 A1 | 11/2006 | French et al. |
| 2007/0028220 A1 | 2/2007 | Miller et al. |
| 2007/0100712 A1 | 5/2007 | Kilpatrick et al. |
| 2007/0101215 A1 | 5/2007 | Holmqvist |
| 2007/0112879 A1 | 5/2007 | Sengupta |
| 2007/0162257 A1 | 7/2007 | Kostyk et al. |
| 2007/0168744 A1 | 7/2007 | Pal et al. |
| 2007/0174023 A1 | 7/2007 | Bassin et al. |
| 2007/0192754 A1 | 8/2007 | Hofsaess |
| 2007/0233414 A1 | 10/2007 | Kratschmer et al. |
| 2007/0234294 A1 | 10/2007 | Gooding |
| 2007/0283325 A1 | 12/2007 | Kumar |
| 2007/0283417 A1 | 12/2007 | Smolen et al. |
| 2007/0300204 A1* | 12/2007 | Andreev et al. ............. 717/104 |
| 2008/0010543 A1 | 1/2008 | Yamamoto et al. |
| 2008/0016415 A1 | 1/2008 | Ide |
| 2008/0022167 A1 | 1/2008 | Chung et al. |
| 2008/0052707 A1 | 2/2008 | Wassel et al. |
| 2008/0072328 A1 | 3/2008 | Walia et al. |
| 2008/0092108 A1 | 4/2008 | Corral |
| 2008/0092120 A1 | 4/2008 | Udupa et al. |
| 2008/0104096 A1 | 5/2008 | Doval et al. |
| 2008/0162995 A1 | 7/2008 | Browne et al. |
| 2008/0163140 A1 | 7/2008 | Fouquet et al. |
| 2008/0178145 A1* | 7/2008 | Lindley ..................... 717/102 |
| 2008/0201611 A1 | 8/2008 | Bassin et al. |
| 2008/0201612 A1 | 8/2008 | Bassin et al. |
| 2008/0255693 A1 | 10/2008 | Chaar et al. |
| 2009/0070734 A1 | 3/2009 | Dixon et al. |
| 2009/0089755 A1 | 4/2009 | Johnson et al. |
| 2009/0217100 A1 | 8/2009 | Grechanik et al. |
| 2009/0319317 A1 | 12/2009 | Colussi et al. |
| 2010/0005444 A1 | 1/2010 | McPeak |
| 2010/0017787 A1 | 1/2010 | Bellucci et al. |
| 2010/0145929 A1 | 6/2010 | Burger et al. |
| 2010/0211957 A1 | 8/2010 | Lotlikar et al. |
| 2010/0275263 A1 | 10/2010 | Bennett et al. |
| 2010/0319004 A1 | 12/2010 | Hudson et al. |
| 2010/0332274 A1 | 12/2010 | Cox et al. |
| 2011/0271137 A1 | 11/2011 | Krieg |
| 2011/0296371 A1 | 12/2011 | Marella |
| 2012/0017195 A1 | 1/2012 | Kaulgud et al. |
| 2012/0053986 A1 | 3/2012 | Cardno et al. |
| 2012/0144374 A1 | 6/2012 | Gallagher et al. |
| 2016/0140021 A1 | 5/2016 | Lopian |

OTHER PUBLICATIONS

Final Office Action dated Apr. 3, 2013 in related U.S. Appl. No. 12/558,327, 11 pages.
Final Office Action dated May 13, 2013 in related U.S. Appl. No. 12/558,382, 12 pages.
Notice of Allowance dated Apr. 24, 2013 in related U.S. Appl. No. 12/558,260, 9 pages.
Final Office Action dated Mar. 29, 2013 in related U.S. Appl. No. 12/558,263, 54 pages.
Ulrich, "Test Case Dependency Processing in Robot Framework", https://groups.google.com/forum/?fromgroups#!topic/robotframework-users/twcycBNLXI4, Google, Feb. 16, 2009, pp. 1-4.
Final Office Action dated Mar. 28, 2013 in related U.S. Appl. No. 12/557,816, 14 pages.
Notice of Allowance dated Apr. 2, 2013 in related U.S. Appl. No. 12/558,147, 10 pages.
Final Office Action dated Jun. 13, 2013 in related U.S. Appl. No. 13/595,148, 8 pages.
Chan et al., "A Tool to Support Perspective Based Approach to Software Code Inspection", Proceedings of the 2005 Australian Software Engineering Conference, IEEE, 2005, 8 pages.
Office Action dated Nov. 5, 2012 in U.S. Appl. No. 12/558,274, 12 pages.
Office Action dated Nov. 8, 2012 in U.S. Appl. No. 12/558,260, 17 pages.
Office Action dated Dec. 20, 2012 in U.S. Appl. No. 12/558,147, 18 pages.
Office Action dated Nov. 8, 2012 in U.S. Appl. No. 13/595,148, 14 pages.
McGarry, J. et al., "Practical Software Measurement: A Guide to Objective Program Insight", http://pdf.aminer.org/000/361/576/practical_software_measurement.pdf, Naval Undersea Warfare Center, Version 2.1, Part 1 to Part 4, 1996, 299 pages.
Jonsson, G., "A Case Study into the Effects of Software Process Improvement on Product Quality", Jun. 2004, Master's Tesis in Computer Science—University of Iceland, 93 pages.
Office Action dated Oct. 11, 2012 in U.S. Appl. No. 12/558,327, 12 pages.
Notice of Allowance dated Aug. 31, 2012 in U.S. Appl. No. 12/558,375, 16 pages.
Hurlbut, "Managing Domain Architecture Evolution Through Adaptive Use Case and Business Rule Models", 1997, pp. 1-42.

(56) References Cited

OTHER PUBLICATIONS

Final Office Action dated Nov. 23, 2012 in U.S. Appl. No. 12/557,886, 42 pages.
Boehm, B., "Software Engineering Economics", IEEE Transactions on Software Engineering, vol. SE-19, No. 1, Jan. 1984, pp. 4-21.
Basili, V. et al., "Comparing the Effectiveness of Software Testing Strategies", IEEE Transactions on Software Engineering, vol. SE-13, No. 12, Dec. 1987, pp. 1278-1296.
Office Action dated Oct. 5, 2012 in U.S. Appl. No. 12/557,816, 13 pages.
Holden, I. et al., "Imporoving Testing Efficiency using Cumulative Test Analysis", Proceedings of the Testing: Academic & Idustrial conference—Practice and Research Techniques, IEEE, 2006, pp. 1-5.
Holden, I., "Improving Testing Efficiency using Cumulative Test Analysis", 2006, 25 slices, retrieved from http://www2006.taicpart.org/presentations/session5/3.pdf, pp. 1-25.
Ponaraseri, S. et al., "Using the Planning Game for Test Case Prioritization", retrieved from http:selab.fbk.eu/tonella/papers/issre2008.pdf, pp. 1-10.
Tonella, P., "Publication List", 2012, retrieved from http://selabibk.eu/tonella/papersbyyear.html, 15 pages.
Office Action dated Jun. 14, 2012 in U.S. Appl. No. 12/557,886, 38 pages.
Ambler, S., "Choosing the Right Software Method for the Job", http://web.archive.org/web/20090219074845 1http://agiledata.org/essays/differentStrategies.html, retrieved Jun. 7, 2012, pp. 1-14.
Unknown, "ASTQB—ISTQB Software Testing Certification : ISTQB Syllabi", http://web.archive.orb/web/20090423053623/http://www.astqb.org/educational-resources/syllabi-management5.php, retrieved Jun. 7, 2012, pp. 1-12.
Office Action dated Oct. 3, 2012 in U.S. Appl. No. 12/558,382, 11 pages.
Office Action dated Apr. 27, 2012 in U.S. Appl. No. 12/558,375, 10 pages.
Office Action dated Nov. 23, 2012 in U.S. Appl. No. 12/558,263, 36 pages.
Kwinkelenberg, R. et al., "Smartesting for Dummies", Oct. 14, 2008, Wiley, 36 pages.
Lazic, L. et al., "Cost Effective Software Test Metrics", WSEAS Transactions on Computers, Issue 6, vol. 7, Jun. 2008, pp. 559-619.
Hou, R. et al., Optimal Release Times for Software Systems with Scheduled Delivery Time Based on the HGDM, IEEE Transactions on Computers, vol. 46, No. 2, Feb. 1997, pp. 216-221.
Notice of Allowance in related U.S. Appl. No. 12/557,816 dated Jun. 14, 2013, 6 pages.
Notice of Allowance in related U.S. Appl. No. 12/558,327 dated Jun. 24, 2013, 6 pages.
Final Office Action in related U.S. Appl. No. 12/558,382 dated Jul. 31, 2013, 13 pages.
Notice of Allowance in related U.S. Appl. No. 13/595,148 dated Sep. 9, 2013 , 14 pages.
Notice of Allowance dated Nov. 1, 2013 in related U.S. Appl. No. 12/557,886, 15 pages.
Notice of Allowance dated Sep. 24, 2013 in related U.S. Appl. No. 13/902,034, 8 pages.
Notice of Allowance dated Oct. 15, 2013 in related U.S. Appl. No. 12/558,382, 9 pages.
Office Action dated Jun. 4, 2014 in related U.S. Appl. No. 14/041,440, 13 pages.
Notice of Allowance dated Jul. 7, 2014 in related U.S. Appl. No. 12/558,263, 9 pages.
Office Action dated Mar. 17, 2014 in related U.S. Appl. No. 13/923,581, 13 pages.
Notice of Allowance dated Aug. 20, 2014 in related U.S. Appl. No. 13/923,581, 11 pp.
Notice of Allowance dated Jan. 30, 2015 in related U.S. Appl. No. 14/041,440, 7 pp.
Final Office Action dated Nov. 20, 2014 in related U.S. Appl. No. 14/041,440, 7 pp.
Office Action dated Jan. 9, 2015 in related U.S. Appl. No. 14/510,296 12, pages.
Office action dated Feb. 27, 2018 in related U.S. Appl. No. 14/996,909, 33 pp.
Notice of Allowance dated Apr. 19, 2017 in related U.S. Appl. No. 15/215,664 , 10 pp.
Final Office Action dated May 25, 2017 in related U.S. Appl. No. 14/996,909, 26 pages.
Office Action dated Jul. 1, 2016 in related U.S. Appl. No. 14/685,700, 10 pp.
Office Action dated Jun. 30, 2016 in related U.S. Appl. No. 15/016,898, 61 pages.
Notice of Allowance dated Dec. 3, 2015 in related U.S. Appl. No. 14/515,609, 26 pages.
Final Office Action dated May 6, 2016 in related U.S. Appl. No. 14/160,954, 35 pp.
Notice of Allowance dated May 31, 2016 for related U.S. Appl. No. 14/844,422, 10 pages.
LSU (Estimating Project Cost & Time. Louisiana State University dated Jul. 25, 2004; retrieved online Oct. 18, 2012; URL:http://laspace.lsu.edu/aces/Lectures/Management/Lecture%205%20-%20Estimating%20Cost.ppt.
Office Action dated Aug. 7, 2015 for related U.S. Appl. No. 14/515,609, 28 pages.
Office Action dated Oct. 6, 2015 for related U.S. Appl. No. 14/160,954, 10 pp.
Office Action dated Oct. 23, 2015 for related U.S. Appl. No. 14/844,422, 9 pages.
Notice of Allowance dated Nov. 2, 2015 for related U.S. Appl. No. 13/930,870, 23 pages.
Final Office Action dated Dec. 15, 2016 in related U.S. Appl. No. 14/658,700, 18 pages.
Office Action dated Jan. 17, 2017 in related U.S. Appl. No. 14/996,909, 18 pages.
Notice of Allowance dated Mar. 8, 2017 in related U.S. Appl. No. 14/685,700, 16 pages.
Office Action dated Jun. 12, 2015 for related U.S. Appl. No. 13/930,870, 16 pages.
Notice of Allowance dated Jun. 18, 2015 for related U.S. Appl. No. 14/510,296 , 11 pages.
Notice of Allowance dated Sep. 21, 2016 in related U.S. Appl. No. 14/160,954, 8 pages.
Notice of Allowance dated Oct. 28, 2016 in related U.S. Appl. No. 15/016,898, 31 pp.
Office Action dated Nov. 18, 2016 in related U.S. Appl. No. 15/215,664, 7 pages.
Notice of Allowance in related U.S. Appl. No. 14/996,909 dated Sep. 13, 2018, 9 pages.
Office Action in related U.S. Appl. No. 15/421,479 dated Nov. 16, 2018, 48 pages.

\* cited by examiner

| Activities \ Triggers | Des. Rev EFF(5%) | Unit Test EFF(6%) | Func Test EFF(50%) | SIT EFF(23%) | UAT EFF(16%) |
|---|---|---|---|---|---|
| Design Conform | ■90% | □ | ■20% | □ | □ |
| Logic/Flow | ■10% | □ | □ | □ | □ |
| Lateral Compat | □ | □ | □ | □ | □ |
| Language | □ | □ | □ | □ | □ |
| Side Effects | □ | □ | □ | □ | □ |
| Concurrency | □ | □ | □ | □ | □ |
| Simple Path | □ | ■90% | □ | □ | □ |
| Complex path | □ | ■10% | □ | □ | □ |
| Coverage | □ | □ | ■50% | □50% | □50% |
| Variation | □ | □ | ■30% | □20% | □20% |
| Sequence | □ | □ | □ | □20% | □20% |
| Interaction | □ | □ | □ | □10% | □10% |
| Recovery | □ | □ | □ | □ | □ |
| Software Config | □ | □ | □ | □ | □ |
| Hardware Config | □ | □ | □ | □ | □ |
| Startup/Restart | □ | □ | □ | □ | □ |
| Blocked Test | □ | □ | □ | □ | □ |
| Total | 100% | 100% | 100% | 100% | 100% |

FIG. 5

| Phase/Activity | Industry Average Cost | Industry Average Cost w/ 20% adjustment | Industry Average Cost w/30% adjustment | Industry Relative Cost | Variance in Literature |
|---|---|---|---|---|---|
| High Level Requirements | $120 | $96 | $84 | 1 | 1 – 1.5 |
| High Level Design | $480 | $384 | $336 | 4 | 3 – 10 |
| Detailed Requirements | $240 | $192 | $168 | 2 | ------ |
| Detailed Design | $840 | $672 | $588 | 7 | ------ |
| Coding / Unit Test | $1200 | $960 | $840 | 10 | 10 – 22 |
| Early Functional Test (ST) | $1920 | $1536 | $1344 | 16 | 16 – 40 |
| SIT | $4560 | $3648 | $3192 | 38 | 35 – 50 |
| UAT | $8400 | $6720 | $5880 | 70 | 60 – 75 |
| Production | $16800 | $13440 | $11760 | 140 | 90 – 170 |

| | Savings (baseline costs) | Savings (discounted costs) |
|---|---|---|
| Opportunity Reduce invalid (25%->10%) | $150,000 | $175,000 |
| Benchmark Reduce invalid (10%->3%) | $70,000 | $52,500 |
| Total | $220,000 | $227,500 |

FIG. 15

SYSTEM AND METHOD TO PRODUCE BUSINESS CASE METRICS BASED ON DEFECT ANALYSIS STARTER (DAS) RESULTS

CROSS REFERENCE TO RELATED APPLICATION

The present invention is related to copending application Ser. Nos. 12/558,327 and 12/558,274, the contents of which are incorporated herein in their entireties by reference.

FIELD OF THE INVENTION

The present invention generally relates to defect analysis, and more particularly, to a method and system to produce business case metrics based on defect reduction method (DRM)/defect analysis starter (DAS) results.

BACKGROUND

While software systems continue to grow in size and complexity, business demands continue to require shorter development cycles. This has led software developers to compromise on functionality, time to market, and quality of software products. Furthermore, the increased schedule pressures and limited availability of resources and skilled labor can lead to problems such as incomplete design of software products, inefficient testing, poor quality, high development and maintenance costs, and the like. This may lead to poor customer satisfaction and a loss of market share for software developers.

To improve product quality, many organizations devote an increasing share of their resources to testing and identifying problem areas related to software and the process of software development. Accordingly, it is not unusual to include a quality assurance team in software development projects to identify defects in the software product during, and after development of a software product. By identifying and resolving defects before marketing the product to customers, software developers can assure customers of the reliability of their products, and reduce the occurrence of post-sale software fixes such as patches and upgrades which may frustrate their customers.

Software testing may involve verifying the correctness, completeness, security, quality, etc. of a product. During testing, a technical investigation may be performed by, for example, executing a program or application with the intent to find errors. If errors are found, one or more areas in the software code may be identified based on the errors. Therefore, developers may alter the code in the identified regions to obviate the error.

After a defect has been fixed, data regarding the defect, and the resolution of the defect, may be classified and analyzed as a whole using, for example, Orthogonal Defect Classification (ODC). ODC is a commonly used complex quality assessment schema for understanding code related defects uncovered during testing.

It is widely accepted in the testing industry that the least expensive defects to fix are those found earliest in the life cycle. However, a problem in complex system integration testing is that there may be very few comprehensive opportunities for projects to remove defects cost effectively prior to late phase testing, and by that point in the life cycle (i.e., late phase testing), defects are relatively expensive to fix. Furthermore, for many projects, there are particular kinds of high impact exposures, defects in the area of security, for example, that are critical to find and fix, but are also difficult to detect using current testing methodologies.

However, software defect analysis models in the public domain today are incapable of providing return on investment metrics, for example, because they do not provide actionable recommendations. Thus, there is no way to understand the return on this investment (e.g., using DAS) in terms of the impact on reducing the numbers of defects found in late phase testing and in production.

As a result, an organization cannot determine that a particular distribution of defects (e.g., as determined by the DAS service) indicates that the organization may need to devote more focus on shifting defect removal to earlier phases in the software development life cycle. Additionally, an organization cannot determine an expected resulting defect distribution should the shifting of the defect removal to earlier phases be achieved. Because current defect analysis models fall short of demonstrating their value relative to their costs, organizations that could benefit the most from in depth code inspection analysis may not frequently leverage in depth code inspection analysis (e.g., for one or more projects).

Accordingly, there exists a need in the art to overcome the deficiencies and limitations described hereinabove.

SUMMARY

In a first aspect of the invention, a method is implemented in a computer infrastructure having computer executable code tangibly embodied on a computer readable storage medium having programming instructions. The programming instructions are operable to receive data including defect analysis starter (DAS)/defect reduction method (DRM) defect analysis data of a software development project and process the data. Additionally, the programming instructions are operable to determine one or more business metrics based on the data and generate at least one report based on the one or more business metrics. The one or more business metrics comprises at least one of a benefit for shifting defect removal earlier, a benefit for preventing an injection of defects, a benefit for reducing a cycle time, a benefit of reducing invalid defects and a benefit for reducing production defects In another aspect of the invention, a system comprises a data receiving tool operable to receive data including at least one of defect analysis starter (DAS)/defect reduction method (DRM) defect analysis data, organization data and other data. Additionally, the system comprises a data processing tool operable process the data and determine one or more business metrics based on the data and a report generation tool operable to generate at least one report based on the one or more business metrics. The business metrics include at least one of a benefit for shifting defect removal earlier, a benefit for preventing an injection of defects, a benefit for reducing a cycle time, a benefit of reducing invalid defects and a benefit for reducing production defects.

In an additional aspect of the invention, a computer program product comprising a computer usable storage medium having readable program code embodied in the medium is provided. The computer program product includes at least one component operable to receive data including defect analysis starter (DAS)/defect reduction method (DRM) defect analysis data of a software development project of an organization and process the data. Additionally, the at least one component is operable to determine one or more business metrics for the organization based on the data including at least one of a benefit for shifting defect removal earlier, a benefit for preventing an injection of defects, a benefit for reducing a cycle time, a benefit of reducing invalid defects and a benefit for reducing production defects. Furthermore, the at least one component is operable to generate at least one report based on the one or more business metrics.

In a further aspect of the invention, a computer system for defect analysis comprises a CPU, a computer readable memory and a computer readable storage media. Additionally, the system comprises first program instructions to receive data including defect analysis starter (DAS)/defect reduction method (DRM) defect analysis data of a software development project of an organization and second program instructions to process the data to determine one or more business metrics for the organization based on the data. The business metrics include at least one of a benefit for shifting defect removal earlier, a benefit for preventing an injection of defects, a benefit for reducing a cycle time, a benefit of reducing invalid defects and a benefit for reducing production defects. Additionally, the system comprises third program instructions to generate at least one report based on the one or more business metrics. The first, second and third program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 5 illustrates an exemplary test process in accordance with aspects of the invention;

FIGS. 14-17 illustrate exemplary business case metrics in accordance with aspects of the present invention.

DETAILED DESCRIPTION

Figure 1:
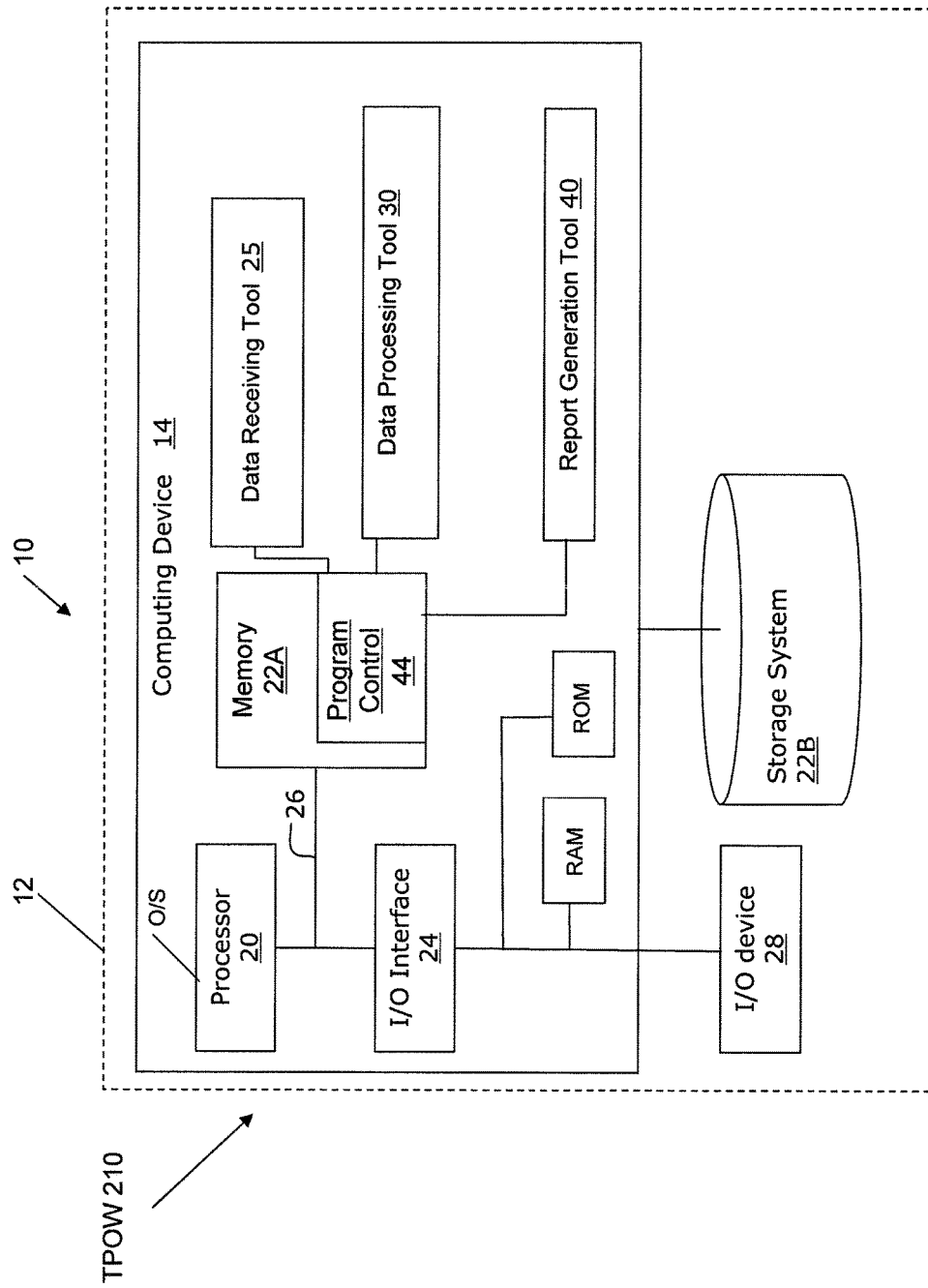
FIG. 1 shows an illustrative environment for implementing steps in accordance with aspects of the invention.

The present invention generally relates to defect analysis, and more particularly, to a method and system to produce business case metrics based on defect reduction method (DRM)/defect analysis starter (DAS) results. A DAS may include a study of primary risks and metrics (e.g., triggers) for an organization's (e.g., a client's) software code project, which is described in U.S. Patent Application Publication No. 2006/0265188, U.S. Patent Application Publication No. 2006/0251073, and U.S. Patent Application Publication No. 2007/0174023, the contents of each of which are hereby incorporated by reference herein in their entirety. A DAS may be performed after a code project has commenced or completed. Thus, in embodiments, DAS results may be used to affect defect prevention and/or removal in a current project (e.g., early testing), analyze (e.g., post-mortem) a project, and/or affect downstream projects.

In embodiments, the present invention is operable to identify, for example, improvement actions (e.g., the highest impact improvement actions) that projects can take to reduce and/or prevent their test and production defects. Additionally, the present invention is operable to project the costs relative to the benefits for each improvement action that may be taken. In embodiments, the present invention applies defect analysis metrics to DRM and/or DAS results to produce, for example, detailed areas for improvement and/or the cost versus the benefit received, e.g., by an organization, if one or more of such areas are improved. In embodiments, the present invention is operable to identify specific immediate benefits in the area of reducing invalid and non-code related defects and reducing production defects.

Implementing the present invention provides an organization business case metrics. By providing improvement recommendations and the supporting metric evidence of the impact of making the improvement with respect to cost and benefit received, the present invention enables an organization to make more informed decisions, for example, with regard to improvement investments. In embodiments, for example, the present invention provides an organization business case metrics (e.g., return on investment business case metrics) to enable determinations as to whether, e.g., an investment is placed in the right improvement actions relative to the organization's goals for their one or more projects (e.g., software development projects).

Moreover, implementing the present invention, provides projects business case metrics that enable (e.g., justify) one or more beneficial improvement investments, for example, by projecting such improvement investments' benefits outweigh their costs (as opposed to other possible improvement investments whose benefits, for example, may not outweigh its costs). By providing an ability to accurately weigh improvement investment strategy options with respect to costs and benefits through a relatively low-cost, automated process, the present invention enables an organization to realize significant quality enhancements progress, e.g., from release to release.

By implementing the present invention, an organization may allow projects to accurately assess the impact of automated code inspections on critical exposure areas, which can in turn be used to more effectively plan late-phase testing and production support needs. For example, the defect analysis report will provide insights that will enable projects to optimize, for example, their go-forward test planning.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory), an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). In embodiments, the environment 10 may be designated as a test planning optimization workbench (TPOW) 210.

The computing device 14 includes a data receiving tool 25, a data processing tool 30 and a report generation tool 40, which are operable to receive data (e.g., the DAS defect analysis, organization data and/or other inputs), process the received data and generate one or more business case metrics, e.g., the processes described herein. For example, in embodiments, the data receiving tool 25 is operable to receive from the DAS defect analysis: production defect rate after DAS actions taken, defects discovered by each trigger, improved valid rate and current invalid rate, and how much percentage defects will be reduced after preventative actions are taken by trigger, amongst other inputs, as discussed further below. Additionally, the data receiving tool 25 is operable to receive from an organization (e.g., a client): a test effort, a test efficiency, defect escape probability tables, a current project profile and/or a test process, amongst other data. Furthermore, the data receiving tool 25 is operable to receive other inputs, including, for example: average cost to fix defect in different phases of a software development life cycle and/or a daily rate for a human resource, amongst additional inputs. Utilizing one or more of the inputs received by the data receiving tool 25, the data processing tool 30 is operable to determine one or more outputs. For example, in accordance with aspects of the invention, the outputs may include one or more of: a benefit for shifting defect removal earlier, a benefit for preventing the injection of defects, a benefit for reducing cycle time, a benefit of reducing invalid defects and a benefit for reducing production defects, amongst other outputs, as discussed further below. The data receiving tool 25, the data processing tool 30 and the report generation tool 40 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device 14 includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls the data receiving tool 25, the data processing tool 30 and the report generation tool 40. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Software testing may involve verifying the correctness, completeness, security, quality, etc. of a product. During testing, a technical investigation may be performed by, for example, executing a program or application with the intent to find errors. If errors are found, one or more areas in the software code may be identified based on the errors. Therefore, developers may alter the code in the identified regions to obviate the error.

After a defect has been fixed, data regarding the defect, and the resolution of the defect, may be stored in a database. The defects may be classified and analyzed as a whole using, for example, Orthogonal Defect Classification (ODC). ODC is a commonly used complex quality assessment schema for understanding code related defects uncovered during testing.

When a DRM defect analysis service (DAS) is performed, several areas (e.g., key areas) with respect to quality and risk are evaluated, and recommended improvements are identified as a result. Once the DAS or DRM defect analysis service analysis has been produced, analysis information from the defect analysis service is input into the TPOW (Test Planning Optimization Workbench) 210. The TPOW 210 (e.g., via the data receiving tool 25, the data processing tool 30 and the report generation tool 40) then produces the business case metrics discussed further below.

High Level Flows

Figure 2:
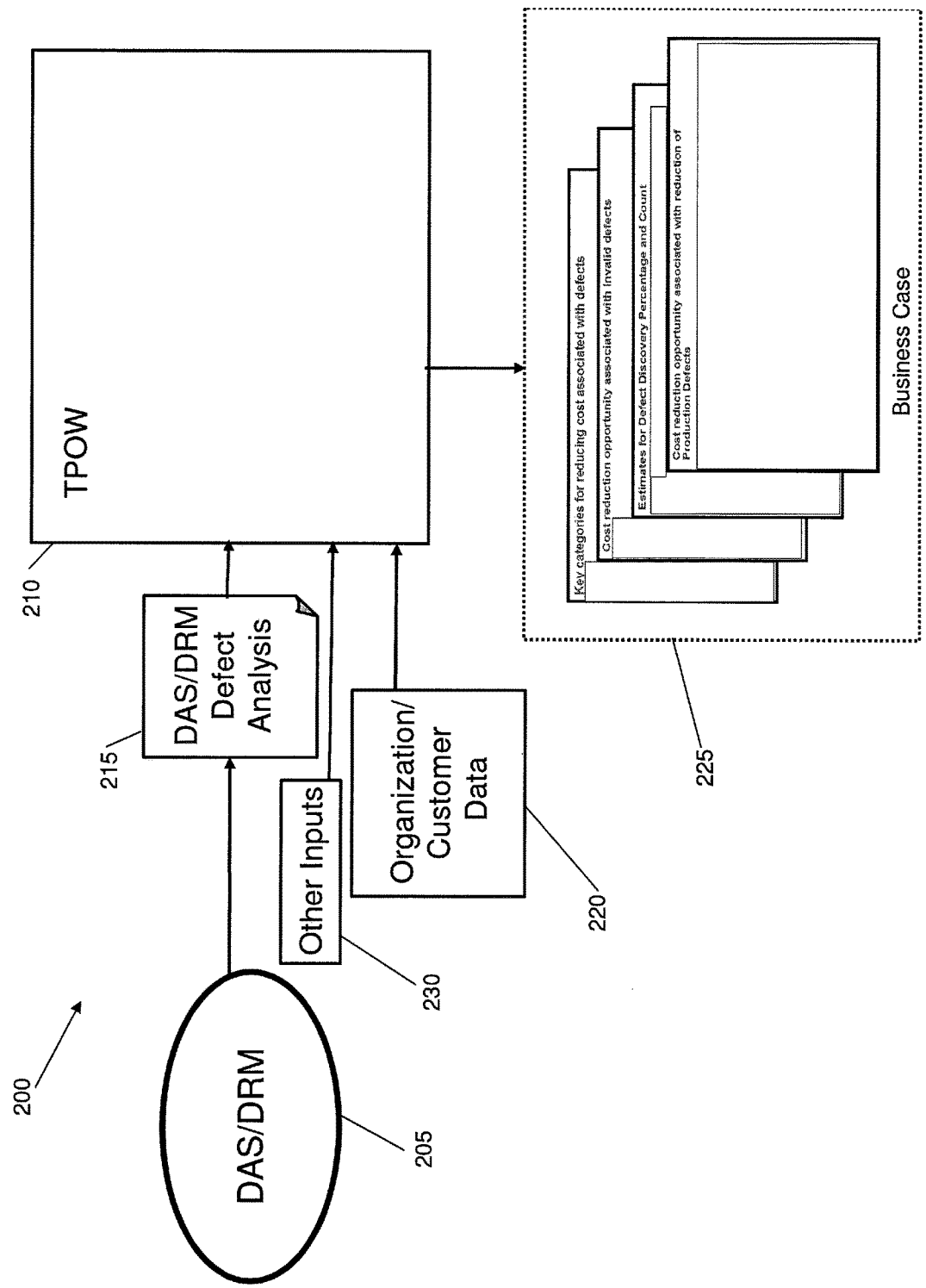
FIGS. 2-3 show exemplary high level flow diagrams in accordance with aspects of the invention.

FIG. 2 illustrates a high level flow 200 in accordance with aspects of the invention. As shown in FIG. 2, a defect analysis service 205 (e.g., DAS/DRM service) is performed on records of software defects provided by a client, which creates output information (e.g., DAS/DRM defect analysis 215). The TPOW 210 receives the output information (e.g., DAS/DRM defect analysis 215), for example, using the data receiving tool 25. Additionally, the TPOW 210 (e.g., using the data receiving tool 25) may receive organization/customer data 220 from the client, e.g., the organization whose defect records have been analyzed by the DAS and/or other inputs 230. The TPOW 210 (e.g., using the data processing tool 25) processes the tool error output 215, the organization/customer data 220 and/or the other inputs 230 and determines one or more business case metrics 225, as explained further below.

Figure 3:
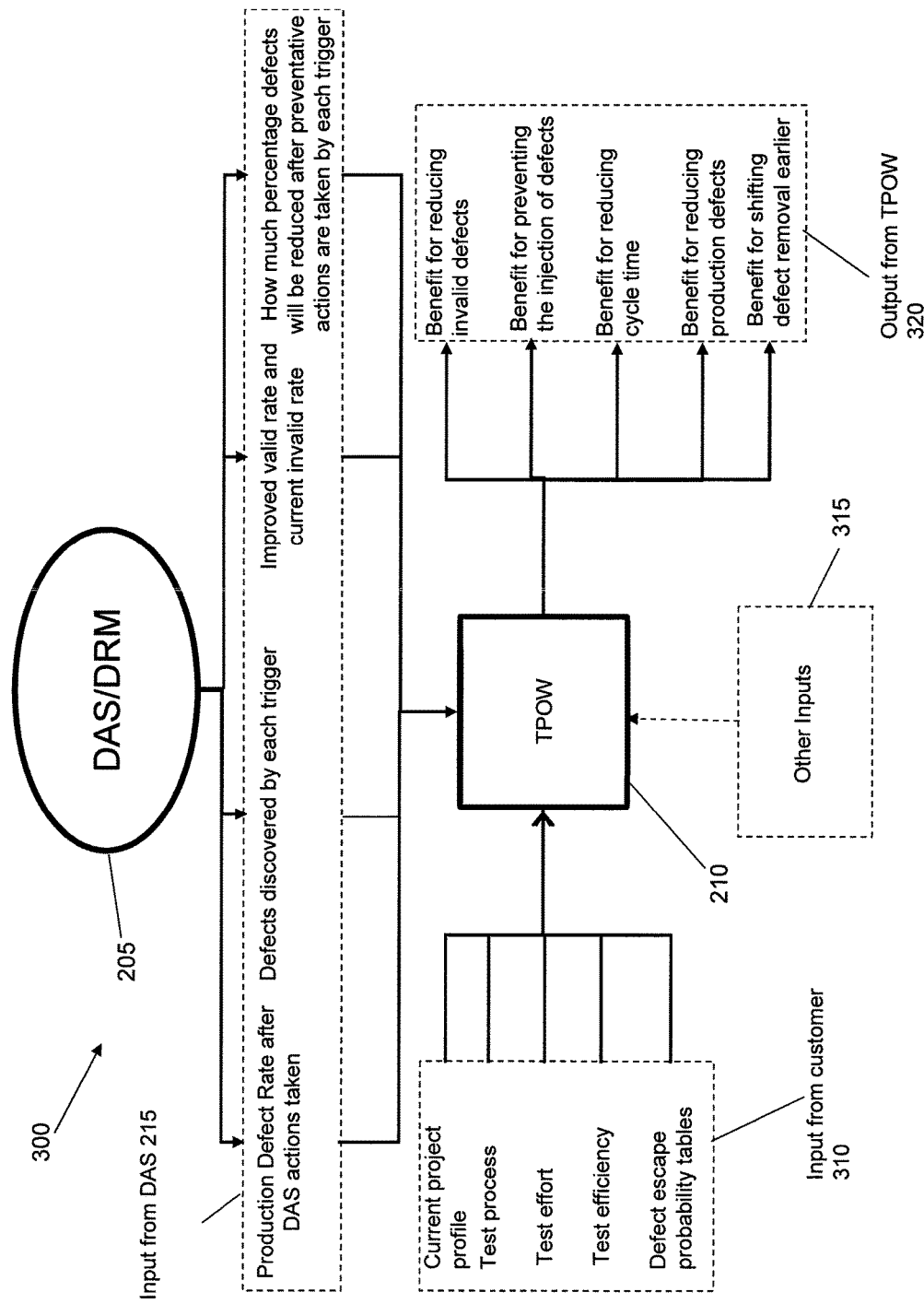

FIG. 3 illustrates another high level flow 300 in accordance with aspects of the invention. As shown in FIG. 3, in embodiments, the TPOW 210 receives inputs from the DAS 205 (e.g., inputs from the defect analysis service). Inputs from the DAS 205 may include, for example, production defect rate after DAS actions taken, defects discovered by each trigger, improved valid rate and current invalid rate, and the percentage defects that will be reduced after preventative actions are taken by trigger, amongst other inputs.

Triggers (or trigger profiles) may be specific conditions present when (or circumstances under which) a defect is uncovered during testing of software code. In one embodiment, related application Ser. No. 12/558,274, discloses a method and system for receiving an output from code inspection services (e.g., an identification of code errors discovered using the code inspection services) and determining a classified data output including defects determined by code inspection services classified by each trigger. The present invention utilizes DAS output (e.g., classified DAS data output), as discussed further below, to identify the defects discovered by each trigger.

Additionally, the present invention utilizes the classified data output to determine the production defect rate after DAS actions taken. Production defects are those that are discovered and/or fixed after the software has been provided to its users, and thus, production defects are very costly and undesirable. The DAS output indicates actions (or DAS actions) for the organization (e.g., a project) to correct code defects and, for example, adjust resource allocation for testing in the software development life cycle. Such DAS actions, once undertaken, will impact the production defect rate (i.e., those defects fixed at the production phase of the life cycle). That is, the DAS actions (or recommendations), once undertaken, should increase the detection of defect in earlier phases of the life cycle (thus, reducing costs), which results in a lower defect rate at the production phase (because defects were fixed earlier). Using the DAS actions (or recommendations), the present invention is operable to determine the production defect rate after DAS actions taken.

Additional input from the DAS 205 includes an improved valid rate and current invalid rate. Valid defects are those for which an underlying software problem could be determined and optionally corrected. Invalid defects are those for which an underlying software problem could not be determined. A defect may be classified as invalid for a number of reasons, including: the software is working as designed, tester error, cannot recreate, duplicate, cancelled, out of scope, new requirement, and/or deferred. Such reasons for an error being invalid are well understood by those having ordinary skill in the art, and, as such, further description of such reasons is not necessary for those of ordinary skill in the art to practice the present invention.

The DAS output indicates actions (or DAS actions) for the organization (e.g., a project) to correct code defects and, for example, adjust resource allocation for testing in the software development life cycle. Such DAS actions, once undertaken, may affect (e.g., improve) the percentage of errors that are valid and affect a current percentage of errors that are invalid. Using the DAS actions (or recommendations), the present invention is operable to determine the expected improved percentage of errors that are valid and a current percentage of errors that are invalid (and why, e.g., working as designed, tester error, cannot recreate, duplicate, cancelled, out of scope, new requirement, and/or deferred), as discussed herein.

Furthermore, the input from DAS 205 includes percentage by which defects will be reduced after preventative actions are taken by trigger. As explained above, the DAS output 215 may indicate actions (or DAS actions) for the organization (e.g., a project) to correct code defects and, for example, adjust resource allocation for testing in the software development life cycle. Such DAS actions, once undertaken, will impact the percentage of defects at phases of the life cycle, which can be classified by their respective triggers (or trigger signatures). Using the DAS actions (or recommendations), the present invention is operable to determine the percentage reduction by trigger for when preventative actions are taken.

Additionally, as illustrated in FIG. 3, the TPOW 210 is operable to receive one or more inputs from a customer 310. In embodiments, such inputs 310 may include a test effort, a test efficiency, defect escape probability tables, a current project profile, potential defects and a test process, amongst other data. The test effort is an indication of how much effort (e.g., quantified in person-days) will be devoted to testing. As the customer (e.g., an organization) may determine how much effort will be devoted to testing, the customer is able to supply this information. The test efficiency indicates approximately how many defects will be discovered by each person-day in each phase of the software lifecycle. If the testing involves multiple teams (e.g., at different locations around the world), the test efficiency may indicate a daily defect discovery rate for each of the teams. In embodiments, the test efficiency (or daily rate) may be determined, for example, through review of historical test efficiencies for the organization, e.g., for other software projects. Defect escape probability tables, which are known to those of ordinary skill in the art, may indicate, for example, that if one defect can be discovered by trigger "x," what is the probability that the same defect can be discovered by trigger "y."

A current product profile may include a size of the software code (e.g., how many lines of code, function points, and/or person-months) and a product difficulty index ("0"-"5") for each of intraface, interface, timing, design and documentation. A current product profile is discussed further below with reference to FIG. 4. A test process indicates an effort distribution by activities and triggers. These inputs from a customer 310 are discussed in more detail with reference to FIG. 5. Furthermore, in embodiments, the TPOW 210 is operable to optionally receive other inputs (e.g., average cost to fix defect in different phases of a software development life cycle, daily rate for a human resource, etc.), which are understood by those of ordinary skill in the art, and some of which are discussed with reference to FIG. 6.

Referring again to FIG. 3, utilizing one or more of the inputs derived from the defect analysis system (DAS) 205, one or more inputs from the customer 310 and/or optionally, one or more other inputs 315, the TPOW 210 is operable to determine one or more outputs 320 from the TPOW. For example, in accordance with aspects of the invention, the output 320 from the TPOW may include one or more of a benefit for shifting defect removal earlier, a benefit for preventing the injection of defects, a benefit for reducing cycle time, a benefit of reducing invalid defects and a benefit for reducing production defects, amongst other outputs. The operation of the TPOW 210 in determining one or more outputs 320 from the TPOW is discussed in further detail with reference to FIGS. 7-13.

Thus, as described above and further below, the present invention is operable to aggregate defect analysis information (and, in embodiments, other information) and project the resulting impact of the DAS actions on the quantity and kind of defects (e.g., by trigger signature, valid/invalid category signature, etc.) found in later points in the project life cycle (and with subsequent projects). By determining the costs and benefits (e.g., business case metrics) associated with discovering code defects, a project, for example, can more accurately assess such costs (and benefits) versus costs associated with other kinds of defects (e.g., invalid defects, data, and environment defects) and more effectively plan the current software development project and future software development projects.

Figure 4:
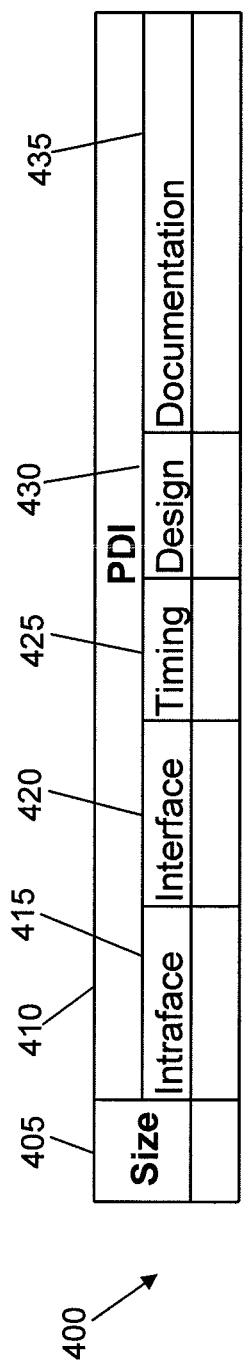
FIG. 4 illustrates an exemplary product profile in accordance with aspects of the invention.

FIG. 4 illustrates an exemplary current product profile 400 in accordance with aspects of the invention. The current product profile indicates a relative size of an organization's software code project as well as a product difficulty index (PDI), which indicates a relative complexity of the project for each of different project attributes, including, for example, intraface, interface, timing, design and documentation. As shown in FIG. 4, the current product profile 400 includes a size column 405 which indicates a size of the software code (e.g., how many lines of code, function points, and/or person-months of development effort). Additionally, the current product profile 400 includes a PDI column 410, which includes sub-columns for intraface 415, interface 420, timing 425, design 430 and documentation 435. In embodiments, a product difficulty index ("0"-"5") for each of the sub-columns for intraface 415, interface 420, timing 425, design 430 and documentation 435 may be determined by the customer, a service provider, and/or a third party. In embodiments, past experience with other projects, for example, may be used to rate the relative complexity of a current project. This determination of PDI may focus on the design content itself, and should not be influenced by, for example, the skill of the team, size of the software code (e.g. KLOC values, where KLOC is an abbreviation thousand (K) (L)ines (O)f (C)ode), time pressures, etc. A PDI area value of "0" indicates that the respective area (e.g., intraface, interface, timing, design and documentation) has no impact on the complexity of the project. Conversely, a PDI area value of "5" indicates that the respective area has a high impact on the complexity of the project.

The PDI value for the intraface area indicates a degree to which relationships within the system (e.g. between modules and/or subroutines within the) are complex and influence design decisions. The PDI value for the interface area indicates a degree to which interface between the product (hardware or software) and other products across the system are complex. If there are a lot of interfaces, for example, but these interfaces are straightforward, the project should not necessarily be considered complex in the context of this factor. The PDI value for the timing (timing/serialization) area indicates an extent to which timing and serialization considerations are considered complex and influence design decisions. For example, such considerations may include lock hierarchy, loss of control, referencing or changing data available for global use, amongst other considerations.

The PDI value for the design (overall design) area indicates an extent to which the overall design is complex. For example, a new function may be moderately complex. However, if, for example, the new function is integrated with other code which is complex, poorly designed, and/or error prone, then a higher PDI value for the design area may be warranted. The PDI value for the documentation (internal documentation) area indicates a degree to which already existing function and interfaces are poorly documented. This may be relevant in environments including inadequately documented heritage and/or ported or vended code. The current product profile (e.g., the size and PDI values) for a project may be used as an input from customer, as described further below.

FIG. 5 illustrates an exemplary test process 500, which indicates an effort distribution by activities and by triggers. As shown in FIG. 5, the activities 525 are listed in the activities row 505 and include activities of the software development life cycle, for example, design review, unit test, function test, system integration test (SIT) and/or user acceptance test (UAT), amongst other activities. The triggers 530 are listed in the triggers column 510 and include triggers (e.g., design conformance, logic/flow, language, etc.) for detected or expected defects. As shown in FIG. 5, the test process 500 indicates for each activity 525 (e.g., design review, unit test, function test, SIT and/or UAT) an expected (or detected) number of defects having each trigger 530. Thus, with exemplary test process 500, at the design review activity, ninety percent of the defects found during this activity are expected to have a design conformance trigger signature and ten percent of the defects found during this activity are expected to have a logic flow trigger signature. As shown in FIG. 5, as indicated in the total row 520, for each activity the total percentage of trigger signatures sums to one-hundred percent.

Additionally, exemplary test process 500 includes an effort row 515, which indicates an expected (or actual) investment of resources (denoted as percentages) for each activity as a percentage of total investment over the entire software development life cycle. Therefore, the sum of the effort at each activity should sum to one hundred percent (e.g., 5%+6%+50%+23%+16%=100%). Returning to the above example, as shown in FIG. 5, the effort row 515 indicates that five percent of the total investment of resources should be devoted to the design review activity. In contrast, fifty percent of the total investment of resources should be devoted to the function test activity (also called a system test).

In embodiments, the test process 500 may be determined based on an organization's maturity profile, as described in related application Ser. No. 12/558,327. Additionally, in embodiments, the test process 500 may be determined, for example, based on an organization's past project data, when available. That is, an organization may review past project data (e.g., a similar project) to determine expected trigger signatures for one or more software development life cycle areas. Additionally, an organization may review past project data (e.g., a similar project) to determine relative investment efforts (e.g., percentages of total investment efforts) for one or more software development life cycle areas.

Figure 6:
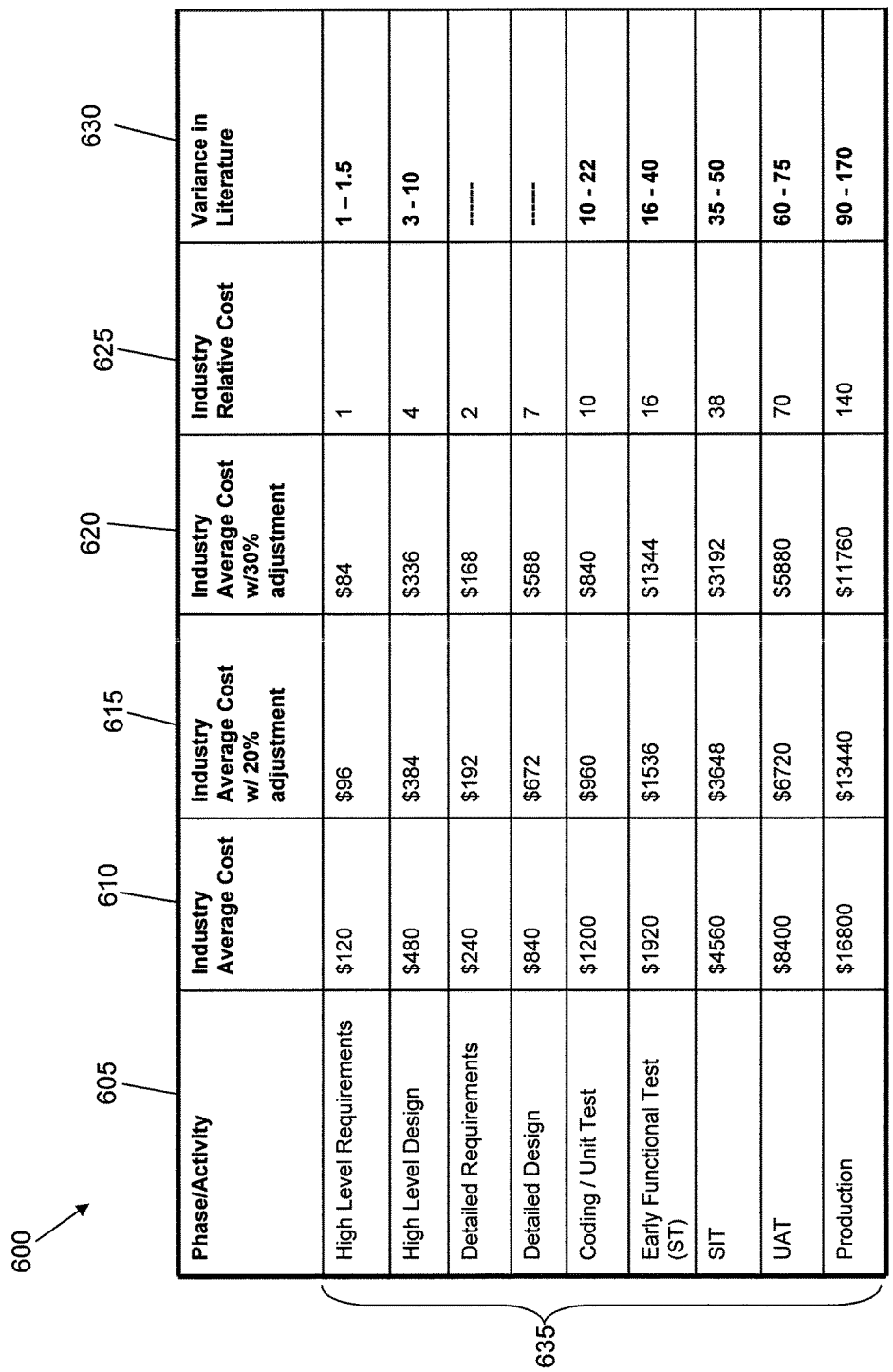
FIG. 6 illustrates an exemplary cost table in accordance with aspects of the invention.

FIG. 6 illustrates an exemplary cost table 600 indicating exemplary average costs to fix a defect in different phases of a software development life cycle. Cost table 600 includes a phase/activity column 605 listing the phase/activities 635 in the software development lifecycle (e.g., high level requirements, high level design, unit test, etc.). Additionally, cost table 600 includes industry average cost for fixing the same defect at the different stages/activities 635. As can be observed from exemplary table 600, the approximate cost to fix a defect at the high level requirements phase is $120. However, with this example, if that same defect is not fixed until the production phase, fixing that same defect will cost $16,800.

Industry average cost with 20% adjustment column 615 and industry average cost with 30% adjustment column 620 indicate the cost for a software fix with 20% and 30% adjustments, respectively, which, in embodiments, may more accurately reflect an organization's cost for fixing the defect. The industry relative cost column 625 indicates the cost of fixing a defect relative to fixing the defect at the high level requirements phase/activity. Thus, for example, high level requirements has an industry relative cost of "1" and high level design has an industry relative cost of "4" ($480/$120=4).

Additionally, exemplary cost table 600 indicates a variance that may be observed for the industry relative cost. For example, while in the exemplary table 600, the industry relative cost for fixing a defect at production is 140, this value may vary between approximately 90 and 170. The derivation of exemplary cost table 600 is well understood in the art, and as such, those of ordinary skill in the art may practice the invention without further explanation of the derivation of exemplary cost table 600. The exemplary cost table 600 may be used as an "other" input 315 to the TPOW 210, as explained further below. As should be understood, cost table 600 is an example of costs for defect escapes. As such, exemplary cost table 600 should not be construed as limiting the present invention.

Flow Diagrams

FIGS. 7-13 show exemplary flows for performing aspects of the present invention. The steps of FIGS. 7-13 may be implemented in the environment of FIG. 1, for example. The flow diagrams may equally represent high-level block diagrams or swim-lane diagrams of the invention. The flowchart and/or block diagrams in FIGS. 7-13 illustrate the architecture, functionality, and operation of possible implementations of systems, methods and computer program products according to various embodiments of the present invention. In this regard, each block in the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 7:
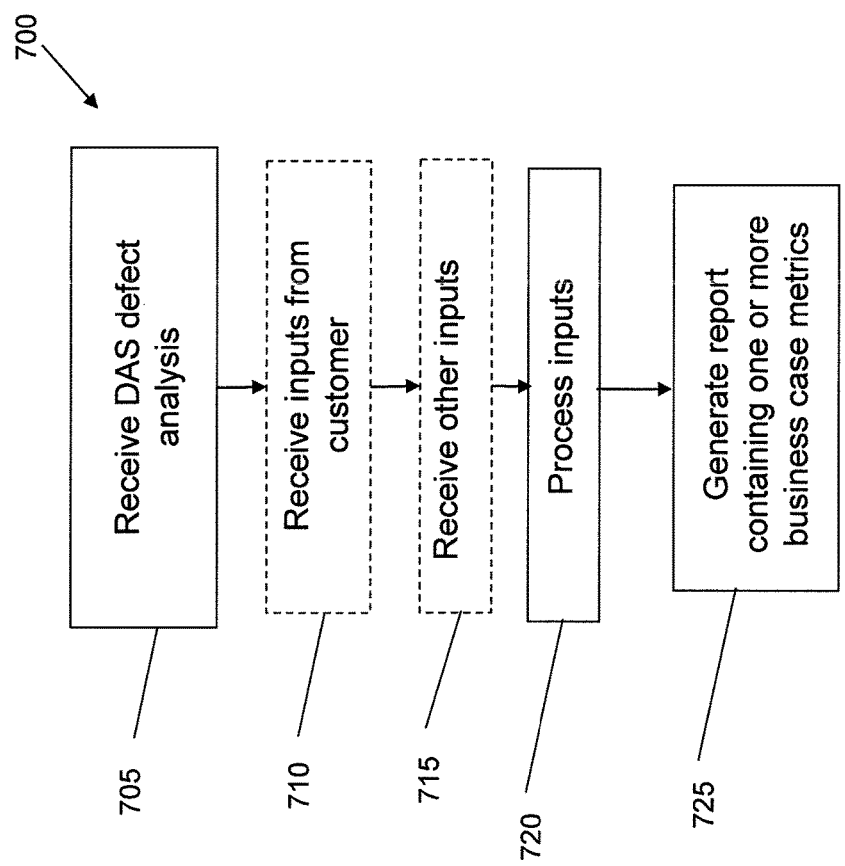
FIGS. 7-13 show exemplary flow diagrams for performing aspects of the present invention.

FIG. 7 illustrates a general exemplary flow 700 for practicing aspects of the invention. As shown in FIG. 700, at step 705, a data receiving tool receives the DAS output (e.g., DAS defect analysis). For example, in embodiments, the DAS defect analysis may include production defect rate after DAS actions taken, defects discovered by each trigger, improved valid rate and current invalid rate, and how much percentage defects will be reduced after preventative actions are taken by trigger. At optional step 710, the data receiving tool receives inputs of data from the customer. For example, in embodiments, the data from a customer may include a test effort, a test efficiency, defect escape probability tables, a current project profile, potential defects and a test process, amongst other data. At optional step 715, the data receiving tool receives other inputs. For example, in embodiments, the other inputs may include average cost to fix defect in different phases of a software development life cycle, daily rate for a human resource, etc. Additionally, in embodiments, the data receiving tool may receive intermediate TPOW data, as explained further below.

At step 720, the data processing tool processes the received data to determine one or more TPOW outputs. Depending on the TPOW output (e.g., a benefit for shifting defect removal earlier, a benefit for preventing the injection of defects, a benefit for reducing cycle time, a benefit for reducing invalid defects and a benefit for reducing production defects, amongst other outputs), the data processing tool may utilize one or more inputs from the customer and one or more other inputs, as explained in more detail below with reference to FIGS. 8-13.

At step 725, the report generation tool generates one or more business case metrics based on the received data, which indicate one or more of a benefit for shifting defect removal earlier, a benefit for preventing the injection of defects, a benefit for reducing cycle time, a benefit for reducing invalid defects and a benefit for reducing production defects. Examples of business case metrics are explained in more detail below with reference to FIGS. 14-17.

Figure 8:
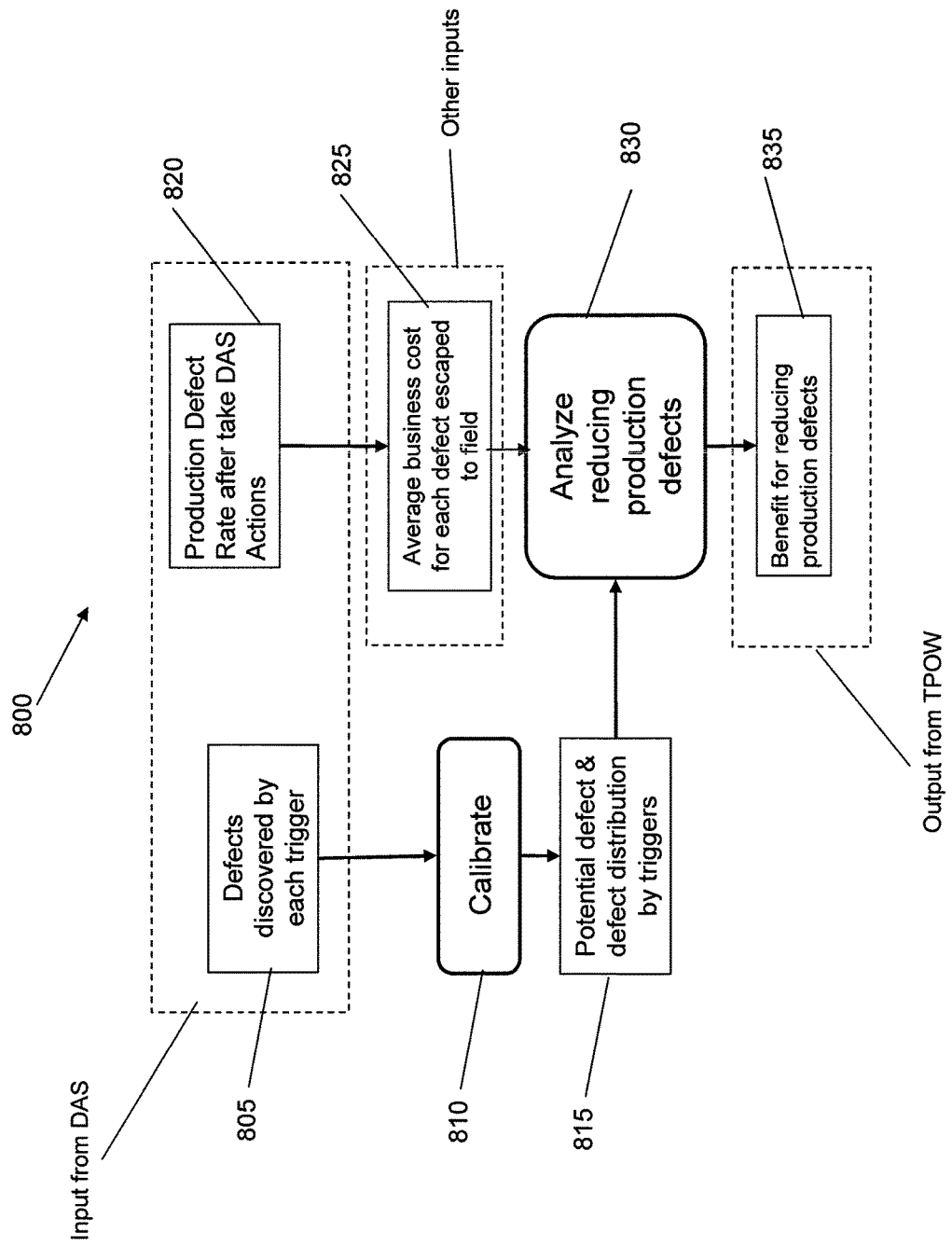

FIG. 8 illustrates an exemplary flow 800 for analyzing the reduction of production phase defects, e.g., defects fixed during the production phase/activity of the software development life cycle. As exemplified by cost table 600 discussed above, fixing a defect at the production phase/activity may be significantly more expensive than fixing that defect at an earlier phase/activity (e.g., at unit test). As such, by reducing the number of defects fixed at the production phase/activity (e.g., by discovering and fixing defects earlier in the software development lifecycle) an organization may realize significant cost savings.

As shown in FIG. 8, to analyze reducing production defects, at step 805, the data receiving tool receives from the DAS the defects discovered by each trigger. That is, the DAS defect analysis will identify the number of defects discovered by each trigger (e.g., design conformance, logic/flow, simple path, etc.). At step 810, the data processing tool calibrates the potential defect volume and distribution by triggers by adjusting (e.g., updating) the potential defect volume and distribution by triggers based upon the discovered defects, to, at step 815, determine a potential defect and defect distribution classified by triggers. That is, upon removing the DAS-identified defects, potential defect volume and distribution by triggers may be affected. Thus, the data processing tool performs the calibration to adjust (e.g., update) the potential defect volume and distribution by triggers based upon the discovered defects.

At step 820, the data receiving tool receives the production defect rate after DAS actions are taken from the DAS defect analysis. At step 825, the data receiving tool receives the average business cost for each defect escaped to production (or field), for example, as shown in FIG. 6. At step 830, the data processing tool analyzes reducing production defects. In embodiments, the data processing tool analyzes reducing production defects by determining the product of the average business cost for each defect that reaches production, and the production defect rate after DAS actions are taken. This resulting product indicates a cost to the business for defects (identified by the DAS) if these defects are not fixed until the production phase. Conversely, the resulting product also indicates a benefit (e.g., a cost savings) for reducing production defects, for example, by fixing the defects discovered through the DAS services (e.g., subsequent to utilization of the DAS, but before the production phase). At step 825, the report generation tool outputs a benefit for reducing production defects (e.g., the cost savings). For example, if code inspection services identify 100 defects, of which 20 would otherwise be missed by subsequent testing phases, and the average business cost of a production defect is $75,000, the report generation tool would output a benefit $1,500,000 in business cost savings.

Figure 9:
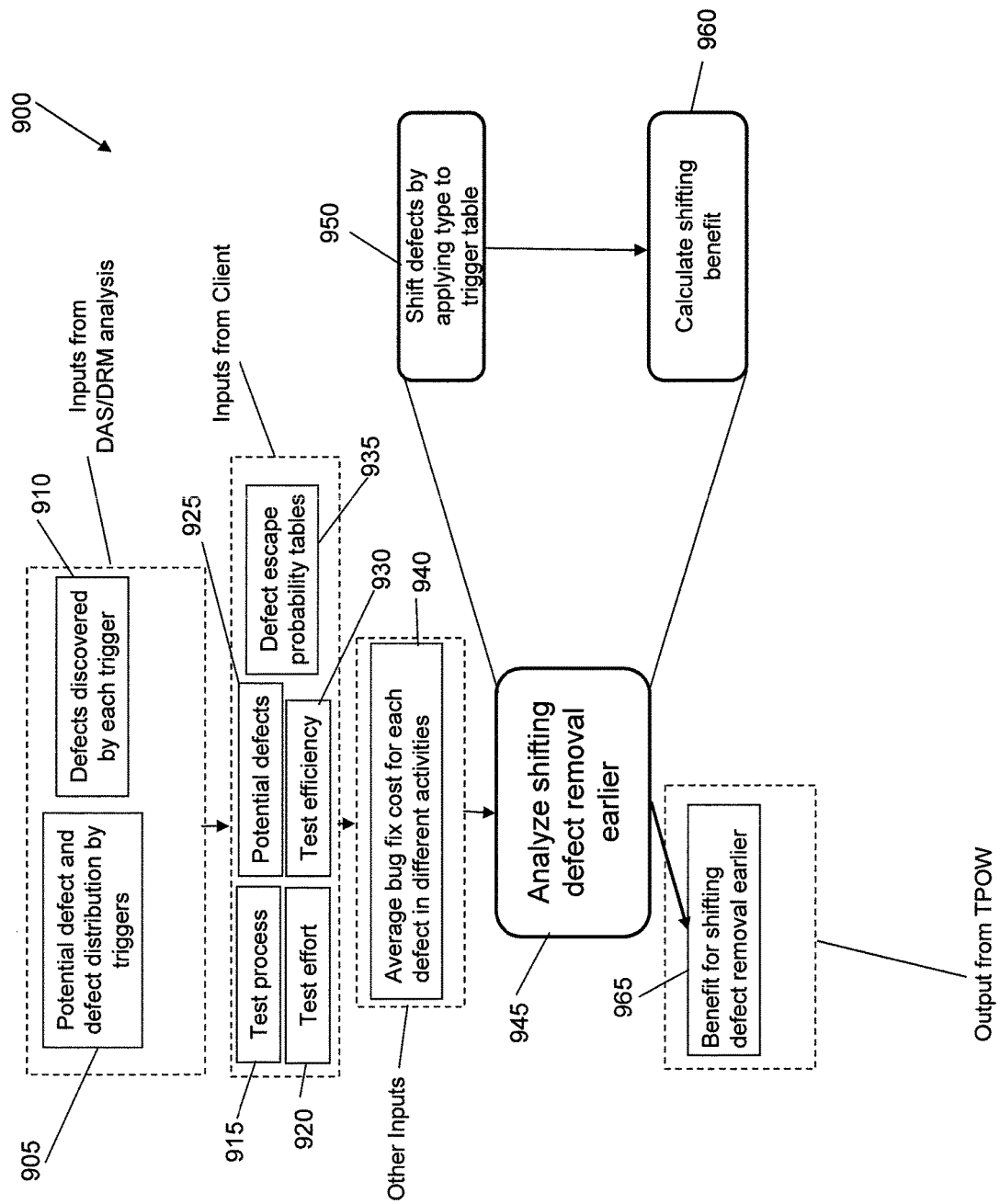

FIG. 9 illustrates an exemplary flow 900 for analyzing the shifting of defect removal earlier in the software development life cycle. As shown in FIG. 9, at steps 905 and 910, the data receiving tool receives data from the DAS analysis. More specifically, at step 905, the data receiving tool receives the potential defect and defect distribution by triggers. Additionally, at step 910, the data receiving tool defects receives the defects discovered by each trigger.

At steps 915-935, the data receiving tool receives data inputs provided by a client. More specifically, at step 915, the data receiving tool receives the test process data. At step 920, the data receiving tool receives the test effort data. At step 925, the data receiving tool receives the potential defects data. At step 930, the data receiving tool receives the test efficiency data. At step 935, the data receiving tool receives the defect escape probability values. At step 940, the data receiving tool receives an average defect fix cost for each lifecycle activity, which is one of the other inputs to step 940.

At step 945, the data processing tool analyses the effects of shifting of defect removal earlier. As explained above, earlier (in the software development life cycle) defect removal can achieve significant cost savings. As can be observed, the step 945 of analyzing the shifting of defect removal earlier comprises sub-steps 950-960. At step 950, the data processing tool determines shift defects by applying a defect type to a trigger table. For example, if there is a same trigger in a subsequent phase as an earlier phase, that defect can be directly shifted to the earlier phase. Otherwise, the defect may be shifted with defect escape probability tables, e.g., as received from the client.

At step 960, the data processing tool determines a shifting benefit. For example, the data processing tool calculates the defect fix cost difference between discovering defects at the source phase (or activity), i.e., prior to the shifting, and discovering the defects at the target (or optimally timed) phase, i.e., once shifting is affected. The costs may be determined using average defect correction costs for each defect by phase (or activity), for example, as shown in FIG. 6.

At step 965, the report generation tool produces one or more business case metrics indicating the benefit for shifting the defect removal earlier. For example, FIG. 6 shows exemplary costs of $1,200 to correct a defect found in the Unit Test phase and $8,400 to correct a defect if found in the User Acceptance Test phase. At step 960, the data processing tool would calculate the defect fix cost of discovering a defect using code inspection services immediately following Unit Test as $1,200; it the data processing tool determined that the defect, in the absence of code inspection services, would have been detected at User Acceptance Test, it would calculate the benefit of shifting detection earlier for this defect as $7,200—the difference between cost to correct at User Acceptance Test and the cost to correct at Unit Test. At step 965, the report generation tool would report a business case that included this $7,200 benefit.

Figure 10:
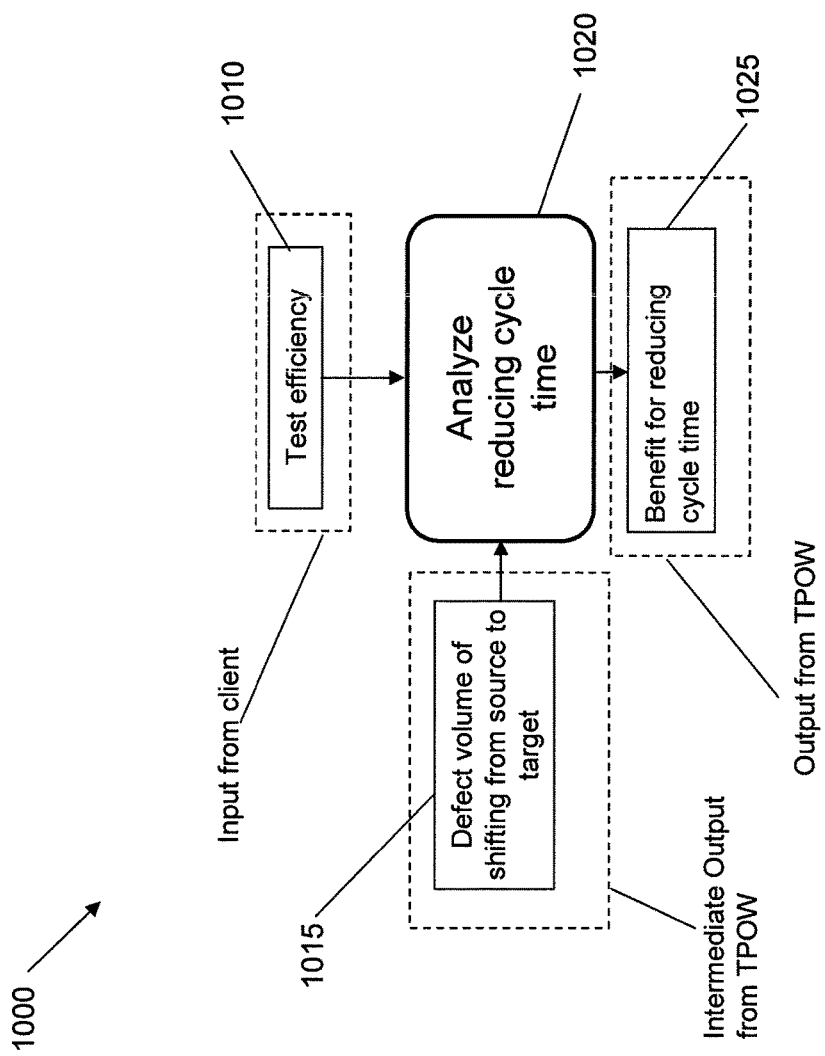

FIG. 10 illustrates an exemplary flow 1000 for analyzing the reduction of cycle time. At step 1010, the data receiving tool receives a test efficiency, which may be provided by the client as described above. At step 1015, the data receiving tool receives the defect volume of shifting from source to target, where source is the current project's forecast of the number of defects to be detected at each lifecycle phase, and target is the forecast of result of implementing DAS recommendations—a forecast of the number of defects to be detected at each lifecycle phase, with some defects to be detected earlier than in the source forecast At step 1020, the data processing tool analyzes reducing cycle time. In embodiments, the data processing tool analyzes reducing cycle time by dividing the shifting defect volume for each lifecycle phase by that phase's testing efficiency. For example, assume that an organization has a testing efficiency in the unit testing phase of 10 defects per person-day, and a testing efficiency in the user acceptance testing phase of 5 defects per person-day. If 100 defects previously detected in user acceptance testing were to be detected instead by unit testing, then the cycle time for those defects in the source forecast would be 100 defects/5 defects detected per person-day, or 20 person-days. In this example, the cycle time for those 100 defects in the target forecast—reflecting the earlier detection—would be 100 defects/10 defects per person-day, or 10 person-days. The benefit for reducing cycle time in this example would be 20 person-days—10 person-days, or 10 person-days. At step 1025, the report generation tool outputs a benefit for reducing cycle time (e.g., a person-day savings).

Figure 11:
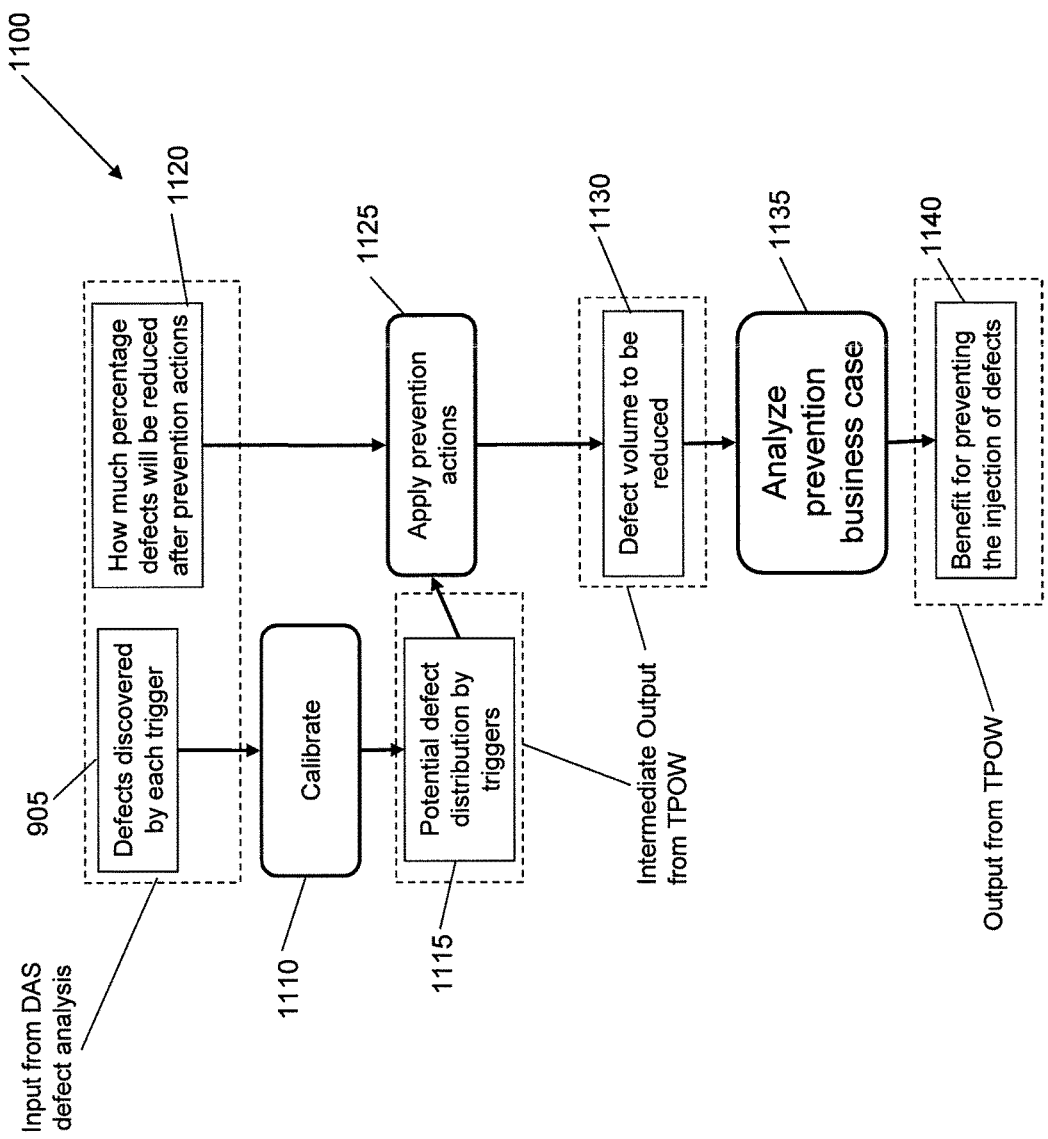

FIG. 11 illustrates an exemplary flow 1100 for analyzing the prevention of defect injection. At step 1105, the data receiving tool receives the defects discovered by each trigger, as determined by the DAS. At step 1110, the data processing tool performs a calibration, wherein the potential defect volume and distribution by triggers is adjusted in accordance with the discovered defects by each trigger (received from the DAS), as already described above. At step 1115, the data processing tool determines a potential defect distribution by triggers based on the calibration and the data receiving tool receives the potential defect distribution by triggers. At step 1120, the data receiving tool receives the percentage defects that will be reduced after prevention actions are taken as determined from the DAS.

At step 1125, the data processing tool applies prevention actions to, at step 1130, determine a defect volume to be reduced. In embodiments, the data processing tool determines a defect volume to be reduced by determining the product of the percentage defects that will be reduced and the total defect volume. At step 1135, the data processing tool analyzes the prevention business case. In embodiments, the data processing tool analyzes the prevention business case by calculating the costs of the yet to be discovered defects and costs of the yet to be escaped defects according to the discovery rate for the total prevention of defects. For example, for discovered defects, a cost is the testing cost plus the fix cost, and for escaped defects, the cost is the business cost (e.g., the cost of fixing the defect at a later phase in the software development life cycle). At step 1140, the report generation tool outputs a benefit for reducing cycle time (e.g., a cost savings).

Figure 12:
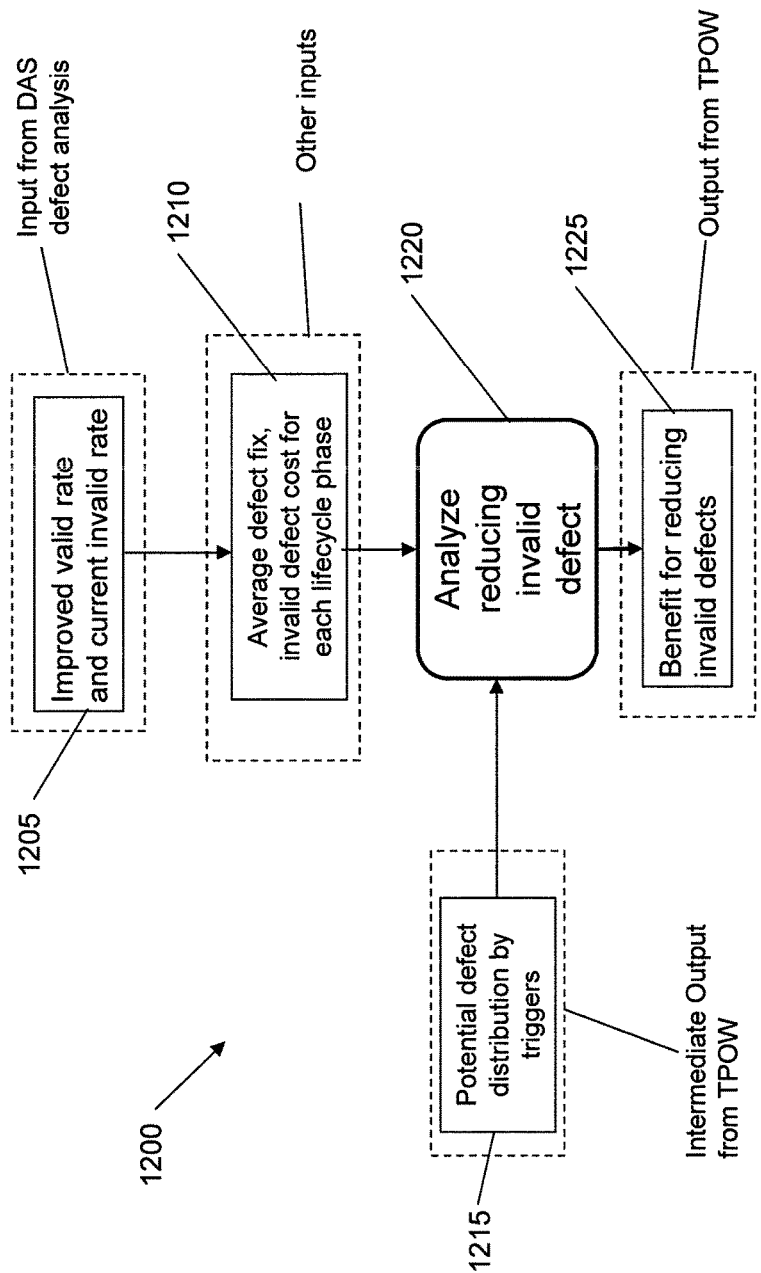

FIG. 12 illustrates an exemplary flow 1200 for analyzing the reduction of invalid defects. At step 1205, the data receiving tool receives the improved valid rate and current invalid rate from the DAS defect analysis. At step 1210, the data receiving tool receives the average defect fix cost and invalid defect cost for each lifecycle activity, for example, as shown in FIG. 6. At step 1215, the data receiving tool receives a potential defect distribution by triggers, described above. At step 1220, the data processing tool analyzes reducing invalid defects. For example, the data processing tool analyzes reducing invalid defects by determining the total reduced invalid defect volume according to equation (1).

Total reduced invalid defect volume=total defect volume*(current invalid rate−improved valid rate)  (1)

Additionally, for example, the data processing tool determines a benefit of reducing invalid defects in each lifecycle phase according to equation (2).

Benefit=total reduced invalid defect volume*average defect fix cost*invalid defect cost coefficient  (2)

wherein, the invalid defect cost coefficient is the ratio by which the costs of reviewing and administering invalid defects (which do not result in code changes) are less than the costs of reviewing, administering, and fixing valid defects.

At step 1225, the report generation tool outputs a benefit for reducing invalid defects (e.g., a cost savings) across all lifecycle phases.

Figure 13:
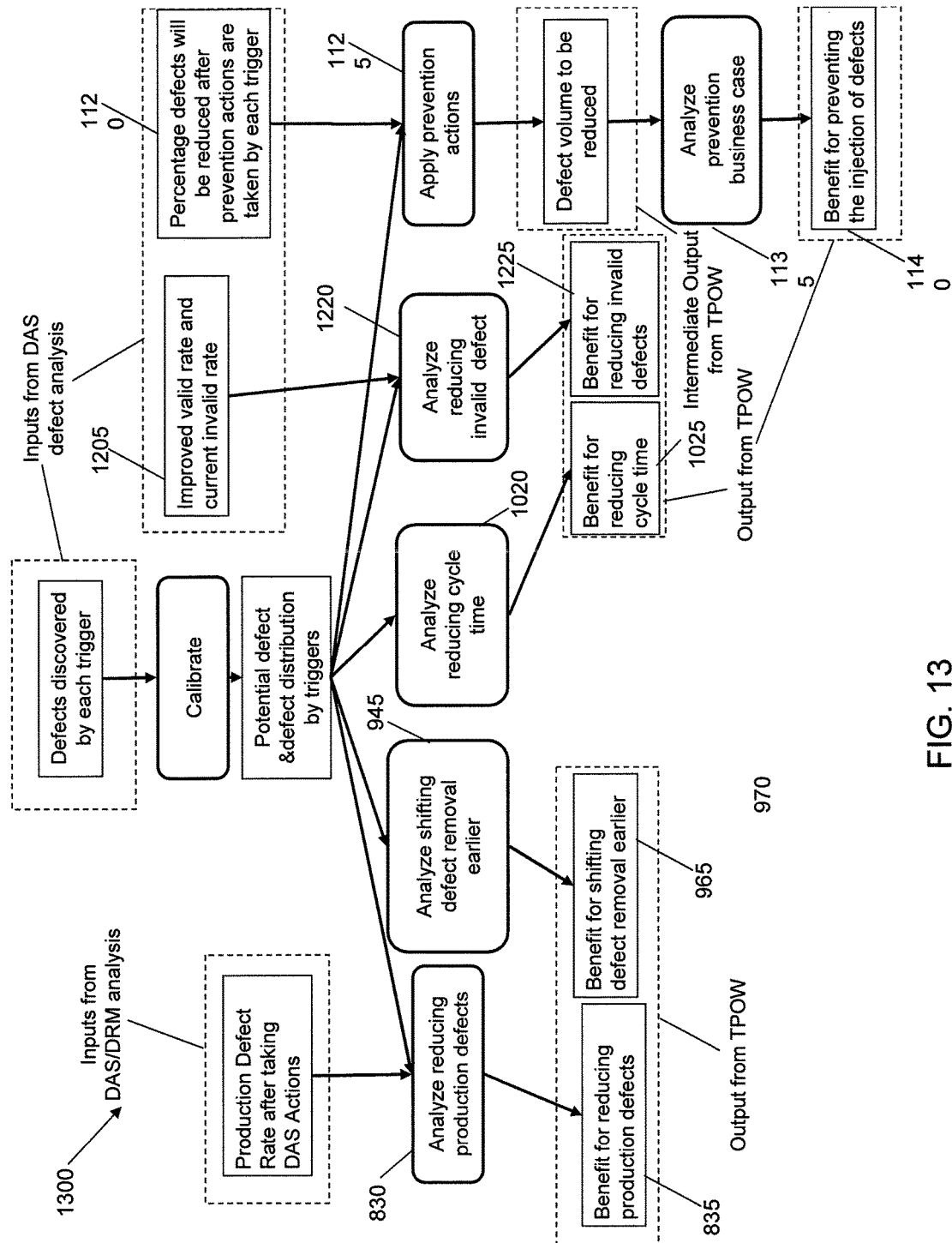

FIG. 13 illustrates an exemplary flow 1300, which is a combined flow of each of FIGS. 7-12. However, as can be observed, the inputs from a client and other inputs are not shown in FIG. 13. More specifically, FIG. 13 illustrates an example of how the different flows may be integrated. Additionally, FIG. 13 illustrates the intermediate outputs (e.g., potential defect distribution by triggers) from the TPOW, and how those intermediate outputs may be used as inputs to the TPOW for other benefit determinations (e.g., benefit for reducing cycle time).

Additionally, FIG. 13 illustrates that some inputs, for example, inputs from the DAS (e.g., defects discovered by each trigger), may be used to determine plural benefits (e.g., a benefit of shifting defect removal earlier and a benefit for preventing the injection of defects). That is, as shown in FIG. 13, the defects discovered by each trigger 805 may be utilized to determine, for example, both a benefit of shifting defect removal earlier 965 and a benefit for preventing the injection of defects 1140.

Exemplary Business Case Metrics

FIGS. 14-17 illustrate examples of business case metrics in accordance with aspects of the invention. The report generation tool 40 may generate such business case metrics using the TPOW outputs, as determined by the data processing tool 30, described in the flow diagrams above. The exemplary business case metrics shown in FIGS. 14-17 indicate one or more of a benefit for shifting defect removal earlier, a benefit for preventing the injection of defects, a benefit for reducing invalid defects, a benefit for reducing cycle time and a benefit for reducing production defects. As should be understood, the business case metrics are exemplary, and thus, should not be construed as limiting the present invention.

Figure 14:
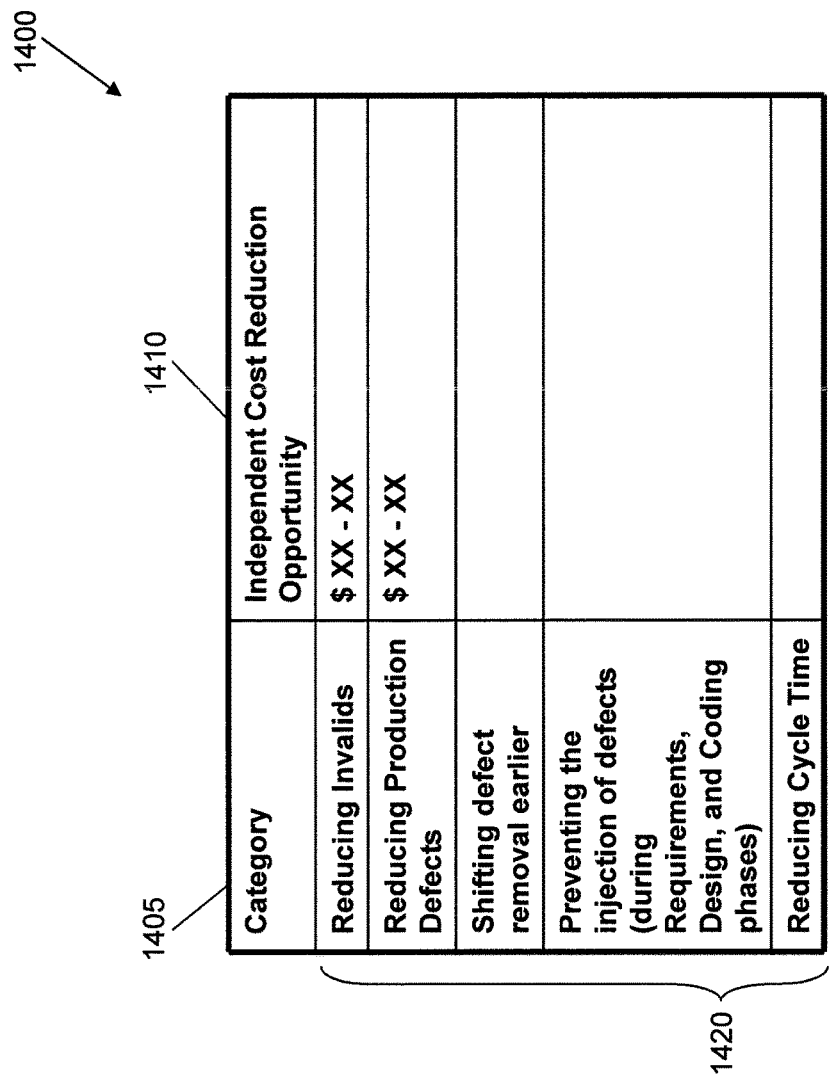

FIG. 14 illustrates an exemplary cost reduction opportunity table 1400. As shown in FIG. 14, the cost reduction opportunity table 1400 includes a category column 1405 listing categories 1420 for reducing defects costs (e.g., reducing invalid defects, reducing production defects, shifting defect removal earlier, preventing injection of defects and reducing cycle). Additionally, the cost reduction opportunity table 1400 includes an independent cost reduction opportunity column 1410, which indicates the independent cost reduction opportunity for each of the listed categories. The values in the independent cost reduction opportunity column 1410 are determined by the data processing tool 30, for example, as described in the flow diagrams above.

The preventing the injection of defects is typically controllable during the requirements, design and coding phases/activities. That is, injection of defects does not typically occur during the testing phases. With regard to shifting of defect removal earlier, it may be possible, for example, to take actions within a late test phase that would shift removal earlier in that phase; however, such actions may not affect cost significantly. Reducing invalid and non-code related defects and the reducing of production defects represent opportunities (e.g., quantified by business metrics) that can be addressed to a significant extent within late test phases of a current project (e.g., $ XX-XX). For example, test teams may control factors that reduce invalid and non-code related defects and/or reduce of production defects. However, each category 1420 represents opportunities that can be addressed with a new release (e.g., a subsequent project). Cycle time reduction may be influenced by each of the other categories 1420.

FIG. 15 illustrates an exemplary business case metric illustrating a cost reduction opportunity associated with invalid defects in accordance with aspects of the invention. Invalid defects are those which are closed with no action taken. That is, in contrast to a valid defect, which is remedied (e.g., code is changed), with an invalid defect, no action is taken. Reducing invalid defects represents a cost reduction opportunity. The present invention provides a method for incorporating the impact of invalid defects on defect projections and related business case metrics.

More specifically, FIG. 15 shows business case summary table 1500, which quantifies a cost savings that, for example, a client may realize if actions recommended by DAS/DRM are taken (e.g., in this example reduce invalid defects; other actions may include reduce production defects, shift defect removal earlier, reduce cycle time, and prevent defect injection). As shown in FIG. 15, table 1500 includes savings columns 1505 (e.g., baseline costs and alternative costs). In embodiments, baseline costs may represent the benefits of invalid defect reduction assuming that the development and testing labor costs remain unchanged; alternative costs may represent the benefits of invalid defect reduction assuming discounted labor costs for development and/or testing.

Exemplary table 1500 also includes savings rows 1510 labeled opportunity and benchmark. In embodiments, an opportunity savings may represent a savings expected if the client were to make the improvements recommended by the DAS/DRM analysis; benchmark savings may represent a savings expected if the client were to improve its performance to match the best results obtained by other organizations in similar circumstances. Take as an example DAS/DRM analysis and recommendations for reducing invalid defects. In this example, assume the client currently has 25% of all defects classified as invalid, that the client could achieve a 10% invalid defect rate by implementing DAS/DRM recommendations, and the best-of-class benchmark is 5%. Additionally, with this example, it is assumed that the client project has 1,000 total defects, and that the average cost of each invalid defect is $1,000.

An opportunity savings, in this example, may represent savings realized by implementing, e.g., one or more recommended DAS actions. For example, a DAS assessment may indicate one or more corrective actions, to reduce invalid defects (e.g., provide training focused on weak areas, ensure appropriate level of knowledge, reduce user acceptance test (UAT) resource volatility). The data processing tool can estimate the savings; an exemplary sample is show in FIG. 15 and explained below. Given a 25% invalid defect rate and a total of 1,000 defects, the current costs of invalid defects is 1,000*0.25*$1,000=$250,000. The cost of invalid defects at the opportunity target of 10% could be calculated as 1,000*0.10*$1,000=$100,000; the resulting cost savings would be $250,000-$100,000=$150,000.

Continuing this example, the calculation of additional savings that may be obtained by improving beyond the 10% invalid defect rate identified as opportunity to the 3% invalid defect rate identified as benchmark could be calculated by computing the benchmark cost for invalid defects (1,000*0.03*$1,000=$30,000) and subtracting that from the $100,000 invalid defect cost at the 10% opportunity rate. This would be a further savings of $70,000, resulting in a total improvement opportunity of $220,000. Finally, the data processing tool is able to perform its benefits calculations using different estimated costs, to reflect different resource selections. If the above example used an average cost of $1,000 for review and administration of each invalid defect to compute the savings (baseline costs) column 1505, an additional example could use an average cost determined by the client—we'll use $750 as an exemplary figure—to compute the Savings (discounted costs) column 1505. The opportunity invalid defects cost would be 1,000 defects*0.10*$750=$75,000; the opportunity benefit could be based on the current at the 25% invalid defect rate and current $1,000/defect costs, producing an opportunity benefit of $250,000-$75,000=$175,000. The benchmark invalid defect costs could be calculated as 1,000 defects*0.03*$750=$22,500; subtracting this from the $75,000 invalid defect cost at the opportunity produces an additional benefit of $52,500.

Additionally, while exemplary invalid defect cost reduction table 1500 is illustrated as a saving opportunity for an individual project (or application), in embodiments, an invalid defect cost reduction table may be used to quantify a savings opportunity across multiple projects (e.g., of a client). For example, if an organization has three projects (e.g., of similar scope and/or complexity), the benchmark and opportunity savings may be multiplied by an extrapolation factor (e.g., three) to determine extrapolated benchmark, opportunity and total savings.

Figure 16:
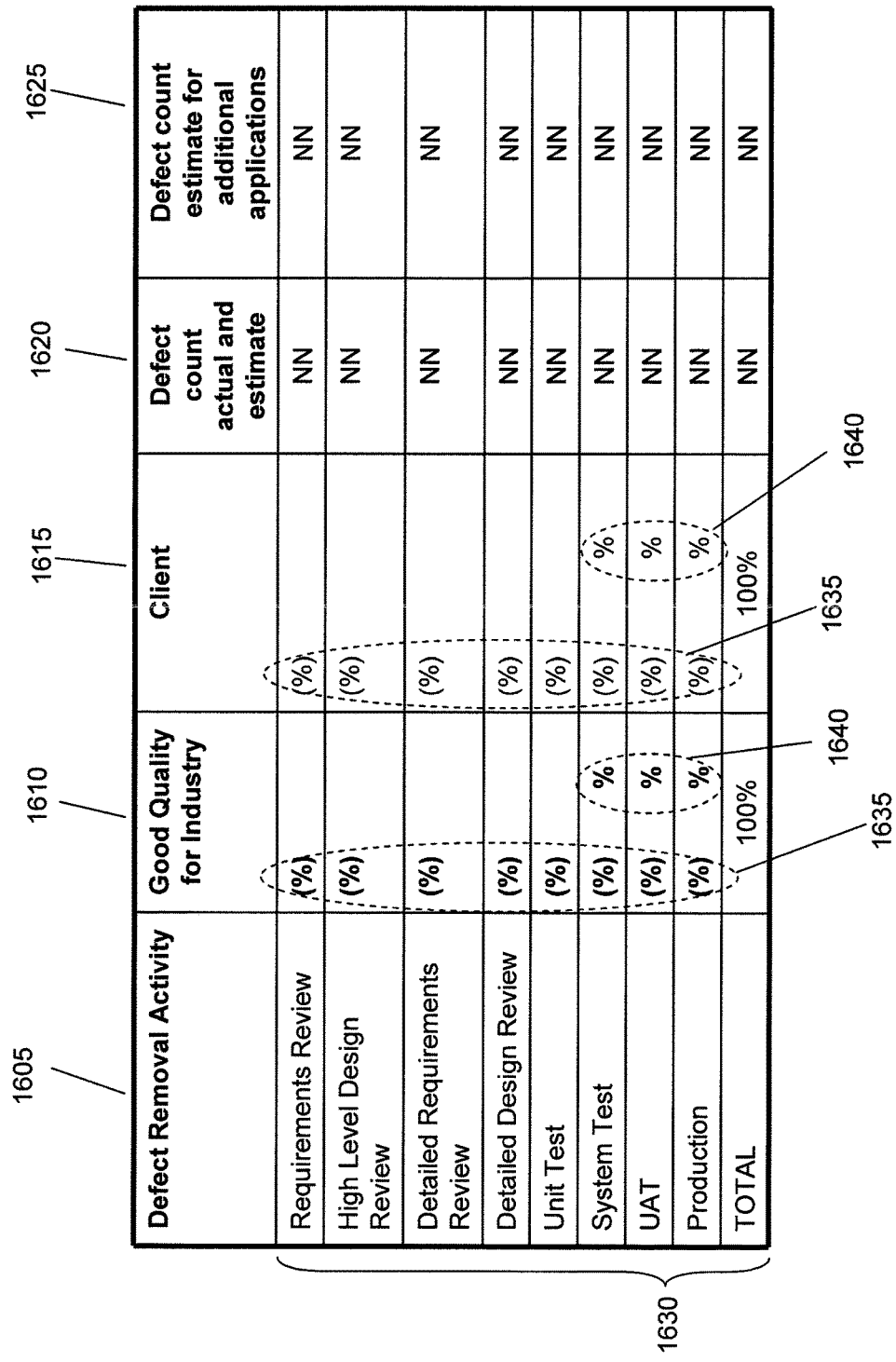

FIG. 16 illustrates an exemplary business case metric table 1600 illustrating estimates for defect discovery percentages and counts in accordance with aspects of the invention. As shown in FIG. 16, table 1600 includes a defect removal activity column 1605 listing the phases 1630 (or activities) of a software development life cycle (e.g., requirements review, unit test, system test, etc.). Additionally, table 1600 includes a good quality for industry column 1610, which indicates established benchmarks of what an ideal percentage of defects that removed at each of the phases 1630. In embodiments, percentages in parentheses 1635 may represent defect distributions spanning all defect removal activities and percentages not in parentheses 1640 may represent defect distribution only for system test, user acceptance test (UAT), and production phases (or activities).

In accordance with aspects of the present invention, the "good quality for industry" by life cycle phase incorporates all defect types in the projections (e.g., both valid and invalid defects). As such, by implementing the present invention, such projections are not limited to evaluating code quality alone, which only represents a subset of all defects that will occur, both in testing and in production. Thus, the present invention provides comprehensive (and therefore, realistic and accurate), defect projections and/or business case metrics because the present invention incorporates all defect types in the projections (e.g., both valid and invalid defects).

Table 1600 also includes a client column 1615, which indicates a client's percentage of defects removed at each of the phases 1630. A defect count actual and estimate column 1620 indicates an actual and/or estimated defect count at each phase 1630 (or activity) for both valid defects and invalid defects. For example, depending on when (e.g., at what phase the DAS is performed), the values in column 1620 may be an actual count or an estimated count. That is, if a DAS analysis is performed at system test, for example, the values in column 1620 for those phases prior to system test (when the DAS defect analysis is performed) may indicate an actual count, whereas the values in column 1620 for those phases subsequent system test may indicate an estimated count (e.g., based on the actual counts). In embodiments, the data processing tool may determine an estimate of defect distributions (e.g., both valid and invalid defects), for all defect removal activities (or phases). The data processing tool may determine the valid/invalid estimate of defect distributions based on client/application data, industry benchmarks and the DAS defect analysis, using one or more of the flows described above.

Table 1600 also includes a defect count estimate for additional applications column 1625, which indicates a defect count estimate for additional applications (e.g., of the client). That is, in a similar manner to that as explained above with FIG. 15, in embodiments, business metrics table may quantify business metrics (e.g., a savings opportunity or defect counts) across multiple projects (e.g., of a client). For example, if an organization has three projects (e.g., of similar scope and/or complexity), the defect counts at the respective phases 1630 may be multiplied by an extrapolation factor (e.g., three) to determine extrapolated defect counts at the respective phases. By providing a client with this information, the client will have a clear understanding of the benefits that should result from taken such actions.

Having a clear understanding of the benefits of such actions, enables the client to make better planning and development decisions, such as implementing such actions, which results in significant cost savings.

Figure 17:
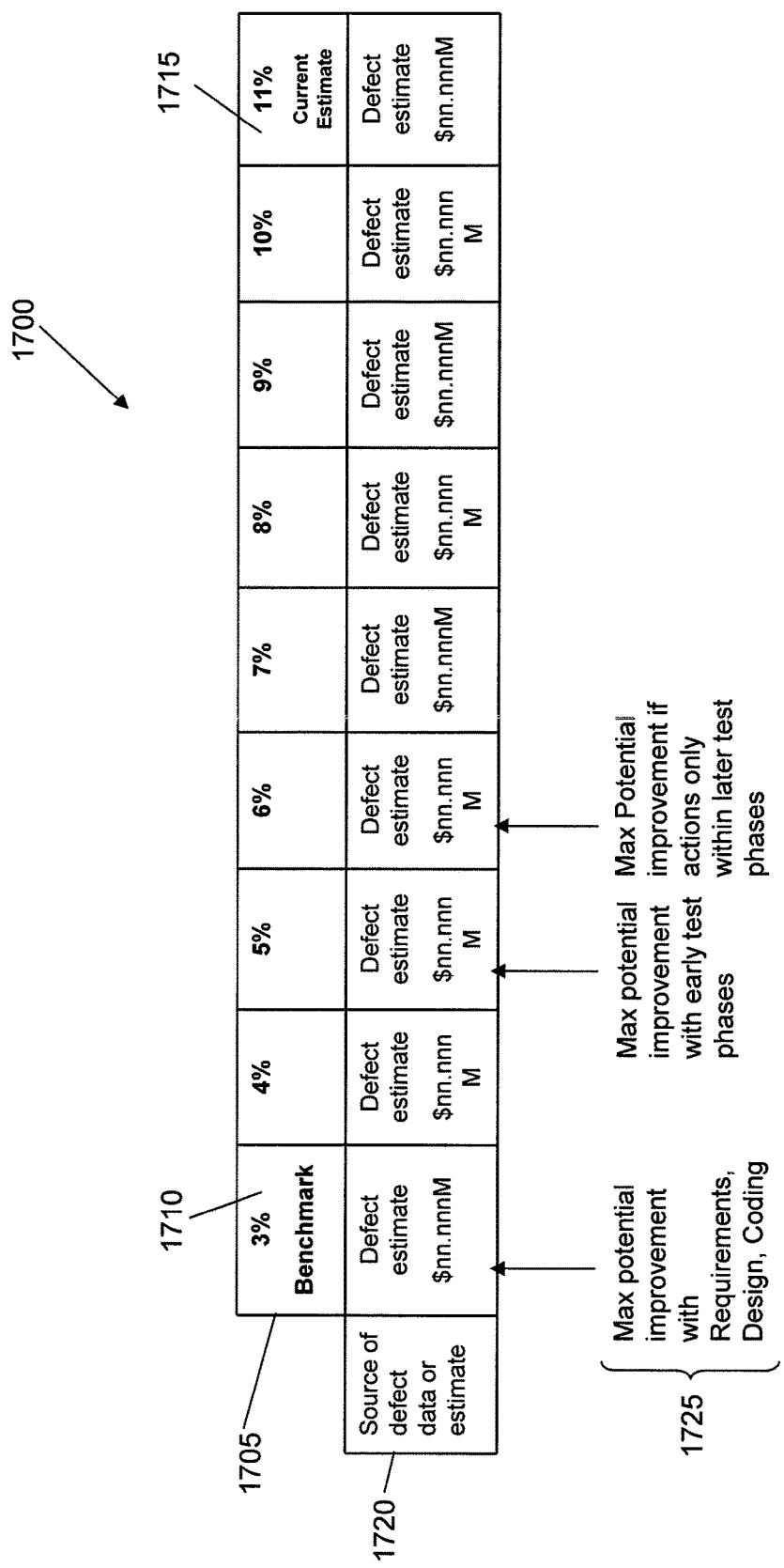

FIG. 17 illustrates an exemplary business case metric table 1700, which indicates the cost reduction opportunity associated with a reduction of production defects. As noted above, production defects (as they arise late in the software development life cycle) are very expensive to remove, as compared to removal earlier in the life cycle. As shown in FIG. 17, exemplary table 1700 includes a percentage of production defects row 1705, which, in embodiments, may range from a benchmark 1710 (of production defects), e.g., three percent, to a current estimate 1715 of production defects (e.g., eleven percent). The benchmark 1710 and the current estimate 1715 of production defects may be determined, as discussed above with reference to FIG. 14.

Additionally, table 1700 includes a defect estimate row 1720, which indicates a defect estimate corresponding to each percentage of production defects. The defect estimates in the defect estimate row 1720 may be determined using the flows described above (e.g., as shown in FIG. 8). Table 1700 also includes a maximum potential improvement row 1725, which indicates what actions would be necessary to achieve the corresponding percentage of production defects.

For example, with the example shown in FIG. 17, a project has a current estimate 1715 of production defects of eleven percent, indicating that eleven percent of the projects total defects will be fixed at the production phase of the life cycle. As indicated in FIG. 17, the maximum potential improvement for the project if actions are taken only within later test phases (e.g., system test (ST), system integration test (SIT), performance test, and/or user acceptance test (UAT)) as a five percent reduction in production defects (as compared to the current estimate). That is, with the example of FIG. 17, actions taken only within later test phase will reduce the production defects from the current estimate of eleven percent down to six percent. In other words, FIG. 17 illustrates (e.g., to a client) that by implementing actions only within later test phases, the number of defects discovered at production will be reduced (e.g., the defects are discovered earlier in the software development life cycle). Furthermore, as indicated by exemplary table 1700, if the organization implements actions within the early test phases (e.g., unit test) in addition to the actions taken in later test phases, the production defect percentage may be reduced to five percent of the total defects. FIG. 17 also illustrates the benchmark 1710 of production defects (e.g., three percent) may be attained with improvements made during the earliest phases of the life cycle (e.g., requirements, design and coding) in addition to the early and later test phase improvements.

Thus, exemplary business case metric table 1700, which quantifies the cost reduction opportunity associated with a reduction of production defects, enables an organization to understand the benefits (actual and/or expected) of improvements (e.g., earlier testing, increased resource investment, etc.) made during the different stages of the software development life cycle. By providing a client with this information, the client will have a clear understanding of the benefits that should result from taken such actions. Having a clear understanding of the benefits of such actions, enables the client to make better planning and development decisions, such as implementing such actions, which results in significant cost savings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure for determining when to remove defects in a production lifecycle of a software product, the method comprising:

receiving data including defect analysis starter (DAS)/defect reduction method (DRM) defect analysis data of a software development project to develop the software product, the DAS/DRM defect analysis data comprises a quantity of defects in the software product discovered by each of a plurality of defect triggers, each comprised of conditions under which a defect is uncovered during testing of the software product, and an estimated percentage of defect reduction in the software product after preventative actions are taken by each defect trigger;

processing the data to identify improvements which have an impact to reduce defects in the software product, and which of the improvements have a highest impact among the identified improvements to reduce defects in the software product to determine which defects to remove and when to remove them to control the number of defects in the completed software product, the processing comprising:

determining cost versus benefit received for making the improvements to provide an improved software product with a reduced number of defects, resolving defects in the software product during development of the software product before marketing the software product;

performing a calibration comprising adjusting a defect volume and a distribution by defect trigger in accordance with the received quantity of defects discovered by each defect trigger;

applying the preventative actions, after the calibration has been performed, to determine a reduction in the defect volume and the distribution by each defect trigger; and calculating a benefit for preventing an injection of defects comprising calculating costs associated with avoidance of discovered defects and costs associated with avoidance of escaped defects according to the determined reduction in the defect volume and the distribution by each defect trigger;

determining one or more business metrics based on the data, wherein the one or more business metrics comprises the benefit for preventing the injection of defects; and generating at least one report regarding proceeding with the development of the software product based on the one or more business metrics, wherein:

at least the step of processing the data is implemented using a processor of the computer infrastructure;

the determining the reduction in the defect volume comprises calculating a product of the percentage of defect reduction and a total defect volume of the software development project;

the one or more business metrics further comprise a benefit for shifting defect removal earlier in a life cycle of developing the software product;

for determining the benefit for shifting defect removal earlier:

the receiving the data comprises receiving a potential defect and defect distribution by triggers and the quantity of defects discovered by each trigger; and the processing the data comprises:

shifting defects by type from a source activity to an optimally-timed discovery, wherein a defect is one of directly shifted and shifted with a defect probability table; and calculating a shifting benefit as a defect fix cost difference between discovering one or more defects at the source activity and discovering the one or more defects at the optimally-timed discovery;

for the discovered defects, the benefit for preventing the injection of defects is the sum of a testing cost and a fix cost; and for the escaped defects, the benefit for preventing the injection of defects is determined based on a business case, the method further comprising;

applying prevention actions to prevent an injection of defects into the software product and to shift defect removal earlier in the lifecycle of developing the software product based upon the benefit calculated for preventing the injection of defects into the software product and the benefit determined for shifting the defect removal earlier in the lifecycle of developing the software product; and applying prevention actions to remove production defects at a time, in the production lifecycle of the software product, determined by a comparison of a first maximum potential decrease in the number of production defects if production defect removal is made in a first test phase of the production lifecycle of the software product and a second maximum potential decrease in the number of production defects if production defect removal is made in a second test phase of the production lifecycle of the software product which is subsequent to the first test phase.

2. The method of claim 1, wherein the DAS/DRM defect analysis data further comprises a production defect rate after DAS actions taken, an improved valid rate, and a current invalid rate.

3. The method of claim 1, wherein the receiving the data further comprises receiving one or more organization inputs, wherein the determining the one or more business metrics is additionally based on the one or more organization inputs.

4. The method of claim 3, wherein the one or more organization inputs comprises at least one of a test effort, a test efficiency, defect escape probability tables, a current project profile, potential defects and a test process.

5. The method of claim 1, wherein the receiving the data further comprises receiving one or more other inputs, wherein the determining the one or more business metrics is additionally based on the one or more other inputs.

6. The method of claim 5, wherein the one or more other inputs comprises at least one of an average cost to fix defect in different phases of a software development life cycle and daily rate for a human resource.

7. The method of claim 1, wherein the one or more business metrics further comprise a benefit for reducing the cycle time; and
wherein for determining the benefit for reducing the cycle time:
the receiving the data comprises receiving a test efficiency; and
the processing the data comprises:
determining a defect volume shifting from a source activity to an optimally-timed discovery; and
calculating the benefit for reducing the cycle time as the defect volume shifting from the source activity to the optimally-timed discovery divided by the test efficiency.

8. The method of claim 1, wherein the one or more business metrics further comprise a benefit of reducing invalid defects; and
wherein for determining the benefit of reducing invalid defects:
the receiving the data comprises:
receiving potential defects and defect distributions by triggers and an improved valid rate and current invalid rate; and
receiving an average fix cost for defects in different activities; and
the processing the data comprises:
calculating a total reduced invalid defect volume as the product of a total defect volume and a difference between the current invalid rate and the improved valid rate; and
calculating the benefit of reducing invalid defects as a product of the total reduced invalid defect volume, the average fix cost for defects in different activities and an adjustment percentage.

9. The method of claim 1, wherein the one or more business metrics further comprise a benefit for reducing production defects; and
wherein for determining the benefit for reducing production defects:
the receiving the data comprises:
receiving potential defects and defect distributions by triggers, which indicates potential production defects;
receiving a production defect rate after DAS preventative actions are taken; and
receiving an average fix cost for defects in different activities;

determining a reduced production defect volume as a difference between potential production defects and the production defect rate after DAS actions; and
the processing the data comprises:
calculating the benefit for reducing production defects as a product of the average fix cost for defects in different activities and the reduced production defect volume.

10. The method of claim 1, wherein a service provider at least one of creates, maintains, deploys and supports the computer infrastructure.

11. The method of claim 1, wherein steps are provided by a service provider on a subscription, advertising, and/or fee basis.

12. A system implemented in hardware comprising a processor for determining when to remove defects in a lifecycle of developing a software product, comprising:
a data receiving tool operable to receive data including at least one of defect analysis starter (DAS)/defect reduction method (DRM) defect analysis data, organization data and other data of a software development project to develop the software product, the DAS/DRM defect analysis data comprises a quantity of defects in the software product discovered by each of a plurality of defect triggers, each comprised of conditions under which a defect is uncovered during testing of the software product, and an estimated percentage of defects reduction in the software product after preventative actions are taken by each defect trigger;
a data processing tool operable to:
identify improvements which have an impact to reduce defects in the software product, and which of the improvements have a highest impact among the identified improvements to reduce defects in the software product to determine which defects to remove and when to remove them to control the number of defects in the completed software product;
determine cost versus benefit received for making the improvements to provide an improved software product with a reduced number of defects,
resolve defects in the software product during development of the software product before marketing the software product;
perform a calibration comprising adjusting a defect volume and a distribution by trigger in accordance with the received quantity of defects discovered by each defect trigger;
apply the preventative actions, after the calibration has been performed, to determine a reduction in the defect volume and the distribution by each defect trigger;
calculate a benefit for preventing an injection of defects comprising calculating costs associated with avoidance of discovered defects and costs associated with avoidance of escaped defects according to the determined reduction in the defect volume and the distribution by each defect trigger;
shift defects by type from a source activity to an optimally-timed discovery, wherein a defect is one of directly shifted and shifted with a defect probability table; and
calculate a shifting benefit as a defect fix cost difference between discovering one or more defects at the source activity and discovering the one or more defects at the optimally-timed discovery;

determine one or more business metrics based on the data, wherein the one or more business metrics comprises the benefit for preventing the injection of defects and a benefit for shifting defect removal earlier; and a report generation tool operable to generate at least one report regarding proceeding with the development of the software product based on the one or more business metrics, the system further being operable to apply prevention actions to prevent an injection of defects into the software product, based upon the benefit calculated for preventing the injection of defects into the software product, and to shift defect removal from a first time in the lifecycle of developing the software product, which is a time used to determine an initial estimate for removing defects, to a second time in the lifecycle of developing the software product, wherein the second time in the lifecycle of developing the software product is earlier in the lifecycle of developing the software product than the first time, based upon the benefit determined for shifting the defect removal earlier in the lifecycle of developing the software product.

13. The system of claim 12, wherein:
the DAS/DRM defect analysis data further comprises a production defect rate after DAS actions taken, an improved valid rate, and a current invalid rate;
the organization data comprises at least one of a test effort, a test efficiency, defect escape probability tables, a current project profile, potential defects and a test process; and
the one or more other inputs comprises at least one of an average cost to fix defect in different phases of a software development life cycle and daily rate for a human resource.

14. The system of claim 12, wherein for determining the benefit for shifting defect removal earlier: the data receiving tool is further operable to receive a potential defect and defect distribution by triggers and the quantity defects discovered by each trigger.

15. The system of claim 12, wherein the determining the reduction in the defect volume comprises calculating a product of a percentage of defect reduction and a total defect volume of a software development project; and
wherein:
for discovered defects, the benefit for preventing the injection of defects is the sum of a testing cost and a fix cost; and
for escaped defects, the benefit for preventing the injection of defects is determined based on a business case.

16. The system of claim 12, wherein the one or more business metrics further comprise a benefit for reducing the cycle time; and
wherein for determining the benefit for reducing the cycle time:
the data processing tool is further operable to:
determine a defect volume shifting from the source activity to the optimally-timed discovery; and
calculate the benefit for reducing the cycle time the processing as the defect volume shifting from the source activity to the optimally-timed discovery divided by a test efficiency.

17. The system of claim 12, wherein the one or more business metrics further comprise a benefit of reducing invalid defects; and
wherein for determining the benefit of reducing invalid defects:

the data processing tool is further operable to:
calculate a total reduced invalid defect volume as a product of a total defect volume and a difference between a current invalid rate and an improved valid rate; and
calculate the benefit of reducing invalid defects as a product of the total reduced invalid defect volume, an average fix cost for defects in different activities and an adjustment percentage.

18. The system of claim 12, wherein the one or more business metrics further comprise a benefit for reducing production defects; and
wherein for determining the benefit of reducing production defects:
the data processing tool is further operable to:
determine a reduced production defect volume as a difference between potential production defects and a production defect rate after DAS actions; and
calculate the benefit for reducing production defects as a product of an average fix cost for defects in different activities and the reduced production defect volume.

19. A computer program product comprising a computer usable storage device having readable program code embodied in the storage device for determining when to remove defects in a production lifecycle of a software product, the computer program product includes at least one component operable to perform steps of:
receiving data including defect analysis defect analysis starter (DAS)/defect reduction method (DRM) defect analysis data of a software development project of an organization to develop the software product, the DAS/DRM defect analysis data comprises a quantity of defects in the software product discovered by each of a plurality of defect triggers, each comprised of conditions under which a defect is uncovered during testing of the software product, and an estimated percentage of defects reduction in the software product after preventative actions are taken by each defect trigger;
processing the data to identify improvements which have an impact to reduce defects in the software product, and which of the improvements have a highest impact among the identified improvements to reduce defects in the software product to determine which defects to remove and when to remove them to control the number of defects in the completed software product, the processing comprising:
determining cost versus benefit received for making the improvements to provide an improved software product with a reduced number of defects,
resolving defects in the software product during development of the software product before marketing the software product;
performing a calibration comprising adjusting a defect volume and a distribution by each defect trigger in accordance with the received quantity of defects discovered by each defect trigger;
applying the preventative actions, after the calibration has been performed, to determine a reduction in the defect volume and the distribution by each defect trigger, wherein the determining the reduction in the defect volume comprises calculating a product of the percentage of defect reduction and a total defect volume of the software development project;
calculating a benefit for preventing an injection of defects comprising calculating costs associated with avoidance of discovered defects and costs associated with avoidance of escaped defects according to the determined reduction in the defect volume and the distribution by each defect trigger;

shifting defects by type from a source activity to an optimally-timed discovery, wherein a defect is one of directly shifted and shifted with a defect probability table; and calculating a shifting benefit as a defect fix cost difference between discovering one or more defects at the source activity and discovering the one or more defects at the optimally-timed discovery;

determining one or more business metrics for the organization based on the data, wherein the one or more business metrics comprises the benefit for preventing the injection of defects and a benefit for shifting defect removal earlier;

generating at least one report regarding proceeding with the development of the software product based on the one or more business metrics, applying prevention actions to prevent an injection of defects into the software product and to shift defect removal earlier in the lifecycle of developing the software product based upon the benefit calculated for preventing the injection of defects into the software product and the benefit determined for shifting the defect removal earlier in the lifecycle of developing the software product; and applying prevention actions to remove production defects at a time, in the production lifecycle of the software product, determined by a comparison of a first maximum potential decrease in the number of production defects if production defect removal is made in a first test phase of the production lifecycle of the software product and a second maximum potential decrease in the number of production defects if production defect removal is made in a second test phase of the production lifecycle of the software product which is subsequent to the first test phase.

20. The computer program product of claim 19, wherein:
the data further comprises one or more organization input,
the determining the one or more business metrics is additionally based on the one or more organization inputs, and
the one or more organization inputs comprises at least one of a test effort, a test efficiency, defect escape probability tables, a current project profile, potential defects and a test process.

21. The computer program product of claim 19, wherein:
the data further comprises one or more other inputs,
the determining the one or more business metrics is additionally based on the one or more other inputs, and
the one or more other inputs comprises at least one of an average cost to fix defect in different phases of a software development life cycle and daily rate for a human resource.

22. A computer system for classifying automated code inspection services defect output for determining when to remove defects in a lifecycle of developing a software product, the system comprising:
a CPU, a computer readable memory and a computer readable storage media;
first program instructions to receive data including defect analysis starter (DAS)/defect reduction method (DRM) defect analysis data of a software development project of an organization to develop the software product, the DAS/DRM defect analysis data comprises a quantity of defects in the software product discovered by each of a plurality of defect triggers, each comprised of conditions under which a defect is uncovered during testing of the software product, and an estimated percentage of defects reduction in the software product after preventative actions are taken by each defect trigger, wherein the receiving the data comprises receiving a potential defect and defect distribution by triggers and the quantity of defects discovered by each trigger;

second program instructions to process the data to identify improvements which have an impact to reduce defects in the software product, and which of the improvements have a highest impact among the identified improvements to reduce defects in the software product to determine which defects to remove and when to remove them to control the number of defects in the completed software product, to determine cost versus benefit received for making the improvements to provide an improved software product with a reduced number of defects, to resolve defects in the software product during development of the software product before marketing the software product, and to determine one or more business metrics of the organization based on the data, the one or more business metrics comprises a benefit for preventing an injection of defects and a benefit for shifting defect removal earlier, wherein the processing the data comprises:

performing a calibration comprising adjusting a defect volume and a distribution by each defect trigger in accordance with the received quantity of defects discovered by each defect trigger;

applying the preventative actions, after the calibration has been performed, to determine a reduction in the defect volume and the distribution by each defect trigger, wherein the determining the reduction in the defect volume comprises calculating a product of the percentage of defect reduction and a total defect volume of the software development project;

calculating the benefit for preventing the injection of defects comprising calculating costs associated with avoidance of discovered defects and costs associated with avoidance of escaped defects according to the determined reduction in the defect volume and the distribution by each defect trigger;

for discovered defects, the benefit for preventing the injection of defects is the sum of a testing cost and a fix cost;

for escaped defects, the benefit for preventing the injection of defects is determined based on a business case;

shifting defects by type from a source activity to an optimally-timed discovery, wherein a defect is one of directly shifted and shifted with a defect probability table; and calculating a shifting benefit as a defect fix cost difference between discovering one or more defects at the source activity and discovering the one or more defects at the optimally-timed discovery;

third program instructions to generate at least one report regarding proceeding with the development of the software product based on the one or more business metrics, and fourth program instructions to apply prevention actions to prevent an injection of defects into the software product, based upon the benefit calculated for preventing the injection of defects into the software product, and to shift defect removal from a first time in the lifecycle of developing the software product, which is a time used to determine an initial estimate for removing defects, to a second time in the lifecycle of developing the software product, wherein the second time in the lifecycle of developing the software product is earlier in the lifecycle of developing the software product than the first time, based upon the benefit determined for shifting the defect removal earlier in the lifecycle of developing the software product, wherein the first, second, third and fourth program instructions are stored on the computer readable storage media for execution by the CPU via the computer readable memory.

\* \* \* \* \*